US012634173B2

(12) United States Patent　(10) Patent No.:　US 12,634,173 B2
Barak et al.　(45) Date of Patent:　May 19, 2026

(54) CHANNEL ESTIMATION REFERENCE SIGNALS FOR PRE-EQUALIZATION

(71) Applicant: QUALCOMM Incorporated, San Diego, CA (US)

(72) Inventors: Tom Barak, Rehovot (IL); Michael Levitsky, Rehovot (IL); Daniel Paz, Atlit (IL); Assaf Touboul, Netanya (IL); Alexander Sverdlov, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 18/469,771

(22) Filed: Sep. 19, 2023

(65) Prior Publication Data

US 2025/0097079 A1　Mar. 20, 2025

(51) Int. Cl.
H04L 25/02　(2006.01)
(52) U.S. Cl.
CPC ........ H04L 25/024 (2013.01); H04L 25/0204 (2013.01)
(58) Field of Classification Search
CPC ............... H04L 25/024; H04L 25/0204; H04L 25/0224; H04L 25/0228
See application file for complete search history.

(56) References Cited

U.S. PATENT DOCUMENTS 7,929,417 B2 *　4/2011　Jung ..................... H04L 5/0023
370/208

8,260,211 B2 *　9/2012　Wan .................... H04L 25/0224
455/67.11
(Continued)

FOREIGN PATENT DOCUMENTS

CA　3163202 A1　7/2021
CN　102202029 A　*　9/2011　......... H04L 27/2633
(Continued)

OTHER PUBLICATIONS

B. Nosrat-Makouei, A. Yazdan-Panah and R. G. Vaughan, "Pilot Feedback Equalization for Time Varying OFDM Systems," 2007 Canadian Conference on Electrical and Computer Engineering, Vancouver, BC, Canada, 2007, pp. 48-51, (Year: 2007).*
(Continued)

*Primary Examiner* — Berhanu Tadese
(74) *Attorney, Agent, or Firm* — Holland & Hart LLP

(57)　ABSTRACT

Methods, systems, and devices that support channel estimation reference signals for pre-equalization are described. In some examples, channel state information (CSI) for a link between a user equipment (UE) and another wireless device may be acquired by the UE based on samples of a downlink reference signal transmitted from the UE to the wireless device. Specifically, the wireless device (e.g., an extended reality (XR) device) may obtain samples of the downlink reference signal (e.g., a channel estimation reference signal) and report or indicate (e.g., transmit) the samples to the UE via an uplink transmission. For example, the reference signals may be sampled at the wireless device side, and CSI may be obtained using the samples signaled back to the UE by the wireless device. The UE may perform channel estimation based on the received samples, which may enable transmit pre-equalization of signals sent to the wireless device.

28 Claims, 19 Drawing Sheets

(56) References Cited

U.S. PATENT DOCUMENTS

| | | | | | |
|---|---|---|---|---|---|
| 10,461,962 | B2 * | 10/2019 | Fechtel | | H04L 25/03159 |
| 10,476,544 | B2 * | 11/2019 | Yu | | H04B 1/1036 |
| 10,530,609 | B2 * | 1/2020 | Kim | | H04L 25/0222 |
| 10,805,122 | B2 * | 10/2020 | Kim | | H04L 25/0222 |
| 10,938,602 | B2 * | 3/2021 | Kons | | H04L 25/0236 |
| 11,362,866 | B2 * | 6/2022 | Kons | | H04L 27/01 |
| 11,552,756 | B2 * | 1/2023 | Sha | | H04L 25/022 |
| 11,831,575 | B2 * | 11/2023 | Sha | | H04L 25/0232 |
| 11,848,803 | B2 * | 12/2023 | Horn | | H04L 25/03343 |
| 11,888,778 | B2 * | 1/2024 | Ryu | | H04L 25/0228 |
| 12,113,593 | B2 * | 10/2024 | Haustein | | H04B 7/0673 |
| 12,237,952 | B1 * | 2/2025 | Paz | | H04L 25/03993 |
| 12,470,433 | B2 * | 11/2025 | Wang | | H04L 25/0232 |
| 2012/0115470 | A1 * | 5/2012 | Zhuang | | H04W 72/542 |
| | | | | | 455/434 |
| 2012/0208577 | A1 * | 8/2012 | Wan | | H04L 5/0048 |
| | | | | | 455/500 |
| 2012/0224498 | A1 * | 9/2012 | Abrishamkar | | H04L 25/0204 |
| | | | | | 370/252 |
| 2012/0328055 | A1 * | 12/2012 | Yokote | | H04L 25/0224 |
| | | | | | 375/340 |
| 2016/0204822 | A1 * | 7/2016 | Yu | | H04L 27/26416 |
| | | | | | 375/219 |
| 2017/0279505 | A1 * | 9/2017 | Zhang | | H04B 7/26 |
| 2020/0153590 | A1 * | 5/2020 | Ko | | H04L 5/005 |
| 2022/0231890 | A1 * | 7/2022 | Horn | | H04L 25/03343 |
| 2022/0311489 | A1 * | 9/2022 | Rakib | | H04L 25/0226 |
| 2022/0352933 | A1 * | 11/2022 | Rakib | | H04B 7/0617 |
| 2023/0006873 | A1 * | 1/2023 | Zhang | | H04L 5/0048 |
| 2023/0397018 | A1 * | 12/2023 | Lee | | H04W 74/006 |
| 2023/0422308 | A1 * | 12/2023 | Lee | | G06N 3/084 |
| 2024/0129755 | A1 * | 4/2024 | Jeon | | G06N 3/0464 |
| 2024/0322922 | A1 * | 9/2024 | Elshafie | | H04W 24/10 |
| 2024/0364562 | A1 * | 10/2024 | Mohammadi | | H04L 25/0232 |
| 2024/0421867 | A1 * | 12/2024 | Huang | | H04B 7/0634 |
| 2025/0016030 | A1 * | 1/2025 | Yue | | H04L 25/0204 |
| 2025/0047460 | A1 * | 2/2025 | Khoshnevisan | | H04L 25/0398 |
| 2025/0071003 | A1 * | 2/2025 | Paz | | H04L 25/0224 |
| 2025/0081208 | A1 * | 3/2025 | Barak | | H04L 25/0224 |
| 2025/0097079 | A1 * | 3/2025 | Barak | | H04L 25/0224 |
| 2025/0112804 | A1 * | 4/2025 | Doshi | | H04W 72/1273 |
| 2025/0274167 | A1 * | 8/2025 | Shi | | H04B 7/0413 |

FOREIGN PATENT DOCUMENTS

| | | | | | |
|---|---|---|---|---|---|
| CN | 103200140 | A | * | 7/2013 | |
| CN | 103200140 | B | * | 5/2016 | |
| CN | 105991490 | A | * | 10/2016 | H04L 27/2654 |
| CN | 106922207 | A | * | 7/2017 | H04L 5/0048 |
| CN | 107624234 | A | * | 1/2018 | H04L 25/0204 |
| CN | 105991490 | B | * | 7/2020 | H04L 27/2654 |
| CN | 107624234 | B | * | 6/2021 | H04L 25/0204 |
| CN | 116418419 | A | * | 7/2023 | H04B 17/14 |
| CN | 117411745 | A | * | 1/2024 | H04L 25/0224 |
| CN | 117917038 | A | * | 4/2024 | H04L 5/0012 |
| CN | 118679713 | A | * | 9/2024 | H04L 5/0048 |
| DE | 19961594 | A1 | * | 6/2001 | H04B 1/711 |
| DE | 10001491 | A1 | * | 7/2001 | H04J 13/00 |
| DE | 10141809 | A1 | * | 5/2002 | H04B 1/62 |
| DE | 19961594 | B4 | * | 8/2013 | H04B 1/711 |
| EP | 1243079 | B1 | * | 1/2007 | H04B 1/711 |
| EP | 2341751 | A1 | * | 7/2011 | H04W 72/29 |
| EP | 2544391 | A1 | * | 1/2013 | H04L 25/0204 |
| EP | 2685686 | B1 | * | 6/2015 | H04L 27/2613 |
| EP | 3236596 | A1 | * | 10/2017 | H04L 5/0048 |
| EP | 3391601 | B1 | * | 11/2020 | H04L 25/0204 |
| EP | 4002782 | A1 | * | 5/2022 | H04L 5/0048 |
| EP | 4184846 | A1 | | 5/2023 | |
| EP | 4236215 | A1 | * | 8/2023 | H04L 25/0204 |
| EP | 4273763 | A1 | * | 11/2023 | H04W 24/08 |
| JP | 4800541 | B2 | * | 10/2011 | H04B 1/711 |
| KR | 20220082870 | A | * | 6/2022 | H04B 7/0673 |
| KR | 20230066389 | A | * | 5/2023 | H04W 74/0833 |
| KR | 20230066390 | A | * | 5/2023 | G06N 3/098 |
| KR | 20230079112 | A | * | 6/2023 | H04W 24/08 |
| WO | WO-0147139 | A2 | * | 6/2001 | H04B 1/711 |
| WO | WO-0152490 | A1 | * | 7/2001 | H04L 25/03343 |
| WO | WO-0219541 | A2 | * | 3/2002 | H04B 1/62 |
| WO | WO-2016095110 | A1 | * | 6/2016 | H04L 5/0048 |
| WO | WO-2016114548 | A1 | * | 7/2016 | H04B 1/1036 |
| WO | WO-2016202516 | A1 | * | 12/2016 | H04L 25/0204 |
| WO | WO-2017105477 | A1 | * | 6/2017 | H04L 25/0228 |
| WO | WO-2017201467 | A1 | * | 11/2017 | H04L 25/0204 |
| WO | WO-2021074000 | A1 | * | 4/2021 | H04B 7/0404 |
| WO | WO-2022080532 | A1 | * | 4/2022 | G06N 3/098 |
| WO | WO-2022080534 | A1 | * | 4/2022 | H04W 74/0833 |
| WO | WO-2022145548 | A1 | * | 7/2022 | H04W 24/08 |
| WO | WO-2022159222 | A1 | * | 7/2022 | H04W 72/21 |
| WO | WO-2023046462 | A1 | * | 3/2023 | H04B 7/0469 |
| WO | WO-2024196598 | A2 | * | 9/2024 | H04W 8/24 |
| WO | WO-2025029410 | A1 | * | 2/2025 | H04B 1/44 |
| WO | WO-2025048985 | A1 | * | 3/2025 | H04W 72/0453 |
| WO | WO-2025049139 | A2 | * | 3/2025 | H04L 25/03993 |
| WO | WO-2025064300 | A1 | * | 3/2025 | H04L 25/0204 |

OTHER PUBLICATIONS

P. Li, Z. Wang and H. Yin, "Joint channel estimation and pre-equalization for monobit transmission system," 2013 IEEE/CIC International Conference on Communications in China (ICCC), Xi'an, China, 2013, pp. 303-308, (Year: 2013).*

X. Dong and Z. Ding, "WLC11-3: Downlink MIMO Channel Estimation for Transmission Precoding," IEEE Globecom 2006, San Francisco, CA, USA, 2006, pp. 1-5, (Year: 2006).*

J. Song et al., "Singular Direction-Based Quantizer and Receiver Designs for User Cooperative Distributed Reception," in IEEE Systems Journal, vol. 17, No. 1, pp. 349-360, Mar. 2023, (Year: 2023).*

International Search Report and Written Opinion—PCT/US2024/046541—ISA/EPO—Dec. 19, 2024 (2305207WO).

Nosrat-Makouei B., et al., "Pilot Feedback Equalization for Time Varying OFDM Systems", 2007 Canadian Conference on Electrical and Computer Engineering, CCECE, IEEE, PI, Apr. 1, 2007, pp. 48-51, XP031176463, the whole document.

* cited by examiner 260-c

Wireless
Device 115-d 105-b

710    Configuration Message

715    Reference Signal(s)

Quantize Reference
Signal Sample(s)   720

725    Sample Message

730   Dequantize Reference
Signal Sample(s)

735   Data

740   Pre-Equalized Data Signal

700

1210          1220          1215

1205

1200

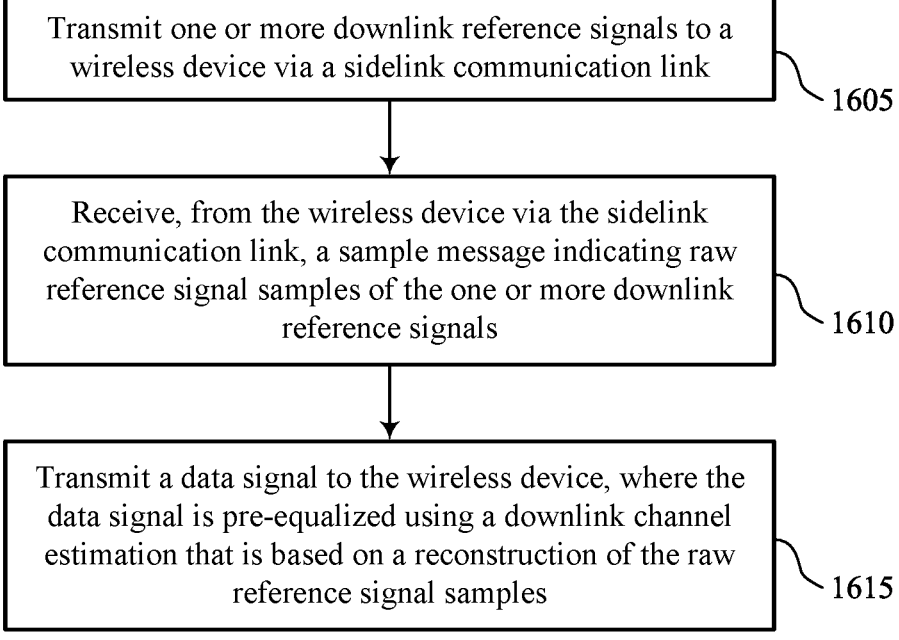

Transmit one or more downlink reference signals to a wireless device via a sidelink communication link
— 1605

Receive, from the wireless device via the sidelink communication link, a sample message indicating raw reference signal samples of the one or more downlink reference signals
— 1610

Transmit a data signal to the wireless device, where the data signal is pre-equalized using a downlink channel estimation that is based on a reconstruction of the raw reference signal samples
— 1615

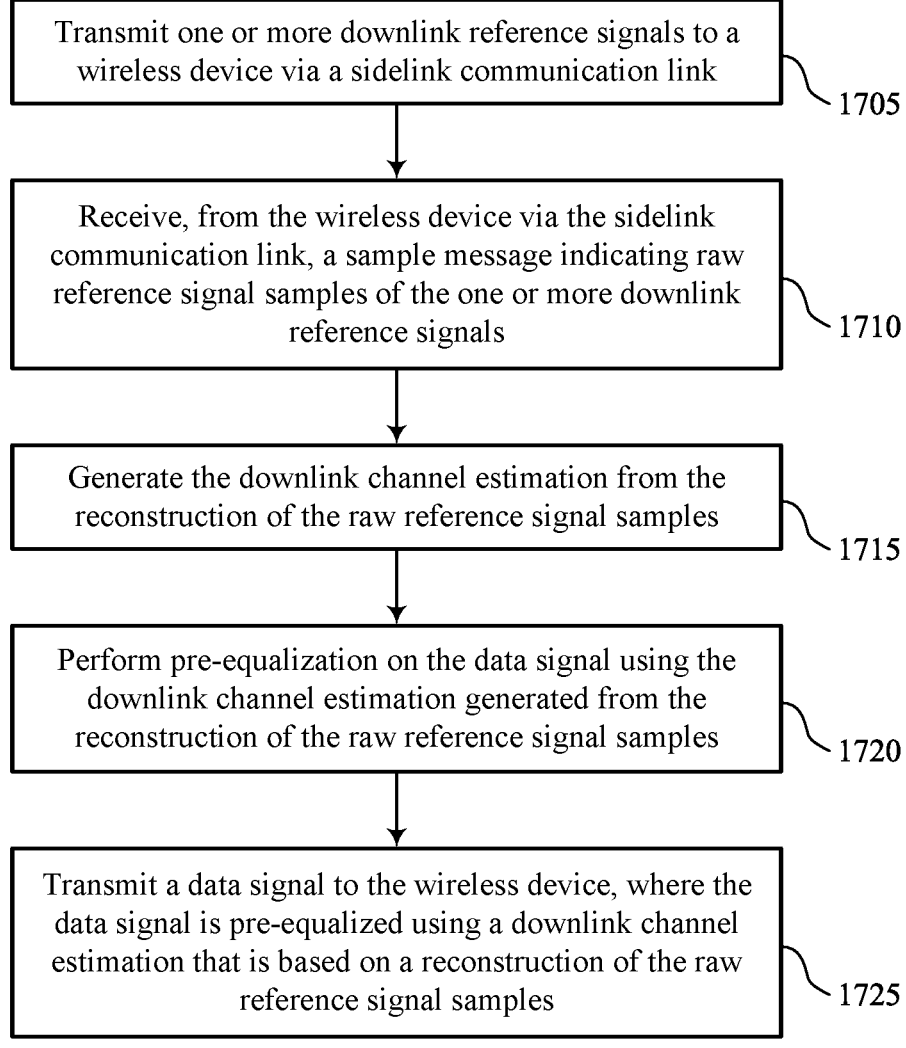

Transmit one or more downlink reference signals to a wireless device via a sidelink communication link

1705

Receive, from the wireless device via the sidelink communication link, a sample message indicating raw reference signal samples of the one or more downlink reference signals

1710

Generate the downlink channel estimation from the reconstruction of the raw reference signal samples

1715

Perform pre-equalization on the data signal using the downlink channel estimation generated from the reconstruction of the raw reference signal samples

1720

Transmit a data signal to the wireless device, where the data signal is pre-equalized using a downlink channel estimation that is based on a reconstruction of the raw reference signal samples

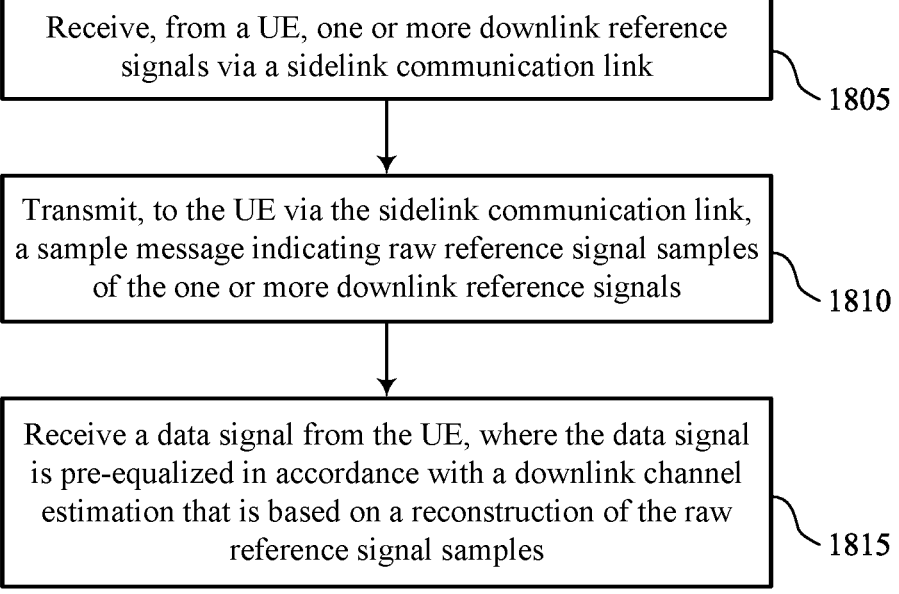

Receive, from a UE, one or more downlink reference signals via a sidelink communication link

1805

Transmit, to the UE via the sidelink communication link, a sample message indicating raw reference signal samples of the one or more downlink reference signals

1810

Receive a data signal from the UE, where the data signal is pre-equalized in accordance with a downlink channel estimation that is based on a reconstruction of the raw reference signal samples

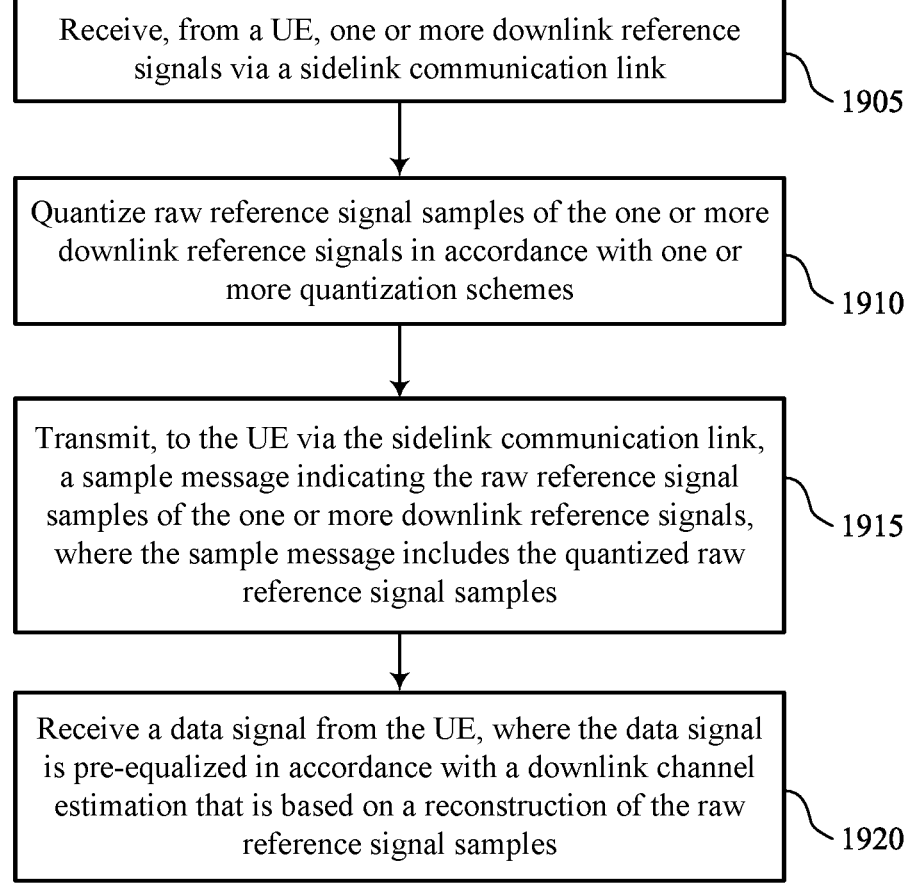

Receive, from a UE, one or more downlink reference signals via a sidelink communication link
⟍1905

Quantize raw reference signal samples of the one or more downlink reference signals in accordance with one or more quantization schemes
⟍1910

Transmit, to the UE via the sidelink communication link, a sample message indicating the raw reference signal samples of the one or more downlink reference signals, where the sample message includes the quantized raw reference signal samples
⟍1915

Receive a data signal from the UE, where the data signal is pre-equalized in accordance with a downlink channel estimation that is based on a reconstruction of the raw reference signal samples
⟍1920

CHANNEL ESTIMATION REFERENCE SIGNALS FOR PRE-EQUALIZATION

FIELD OF TECHNOLOGY

The following relates to wireless communications, including channel estimation reference signals for pre-equalization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Some UEs support device-to-device communications. For example, a UE may communicate with one or more devices via a sidelink. Sidelink communications may allow communications directly between devices such as smartphones and vehicles.

SUMMARY

The described techniques relate to improved methods, systems, devices, and apparatuses that support channel estimation reference signals for pre-equalization. For example, the described techniques provide for reducing wireless device receiver complexity and power consumption when transmit pre-equalization is used (e.g., in cases without channel reciprocity). In some aspects, a user equipment (UE) may communicate with a wireless device (e.g., an extended reality (XR) device, a peripheral device) via a sidelink communication link. In some examples, channel state information (CSI) for such communications may be acquired on the user equipment (UE) side based on samples of a downlink reference signal transmitted from the UE to the wireless device. Specifically, the wireless device may obtain samples of the downlink reference signal and report or indicate (e.g., transmit) the samples (e.g., raw samples) to the UE via an uplink transmission for downlink channel estimation evaluation. For example, the reference signals may be sampled at the wireless device side and CSI may be obtained by the UE using the samples signaled to the UE by the wireless device. As such, the UE may perform channel estimation for communications with the wireless device, which may allow transmit pre-equalization, thereby offloading channel estimation processes from the wireless device.

Such procedures may be supported with a channel estimation reference signal, such as a demodulation reference signal (DMRS) or a channel state information-reference signal (CSI-RS). In some examples, the reference signal (e.g., the DMRS, the CSI-RS) may be modified or extended.

To support a transmit pre-equalization scheme for highly frequency-selective channels, a relatively dense frequency domain pattern may be utilized for the channel estimation reference signal. In some aspects, the channel estimation reference signal may be decoupled from downlink data transmission in some cases, where pre-equalization may be evaluated or adjusted on the UE side for each downlink data transmission or before any downlink data transmission.

Some examples of the techniques described herein provide reference signal structures and related reference signal sample (e.g., raw CSI) indication procedures. Some examples of the reference signal may refer to aspects of DMRS or CSI-RS, such that CSI sampling procedures may be based on a relatively dense frequency domain pattern, may not have tight coupling to downlink data, and may be associated with (e.g., coupled with or accompanied by) the corresponding sampled reference signal (e.g., raw CSI) indication in an uplink signal. In some examples, the reference signal samples may be conveyed in association with an uplink data container similar to sidelink control information (SCI) part 2 and with reduced latency (e.g., ultra-low latency). In some examples, a procedure for reference signal sample (e.g., raw CSI) indication or reporting may be utilized to reduce or preserve a relatively low or reasonable uplink signaling volume. To achieve a relatively low uplink signaling overhead or volume (of reference signal samples or raw CSI indications), a reference signal quantization scheme or a relatively low-complexity sample compression scheme may be applied.

A method for wireless communications at a UE is described. The method may include transmitting one or more downlink reference signals to a wireless device via a sidelink communication link, receiving, from the wireless device via the sidelink communication link, a sample message indicating raw reference signal samples of the one or more downlink reference signals, and transmitting a data signal to the wireless device, where the data signal is pre-equalized using a downlink channel estimation that is based on a reconstruction of the raw reference signal samples.

A UE for wireless communications is described. The UE may include one or more memories storing processor executable code, and one or more processors coupled with the one or more memories. The one or more processors may individually or collectively be operable to execute the code to cause the UE to transmit one or more downlink reference signals to a wireless device via a sidelink communication link, receive, from the wireless device via the sidelink communication link, a sample message indicating raw reference signal samples of the one or more downlink reference signals, and transmit a data signal to the wireless device, where the data signal is pre-equalized using a downlink channel estimation that is based on a reconstruction of the raw reference signal samples.

Another UE for wireless communications is described. The UE may include means for transmitting one or more downlink reference signals to a wireless device via a sidelink communication link, means for receiving, from the wireless device via the sidelink communication link, a sample message indicating raw reference signal samples of the one or more downlink reference signals, and means for transmitting a data signal to the wireless device, where the data signal is pre-equalized using a downlink channel estimation that is based on a reconstruction of the raw reference signal samples.

A non-transitory computer-readable medium storing code is described. The code may include instructions executable by one or more processors to transmit one or more downlink reference signals to a wireless device via a sidelink communication link, receive, from the wireless device via the sidelink communication link, a sample message indicating raw reference signal samples of the one or more downlink reference signals, and transmit a data signal to the wireless device, where the data signal is pre-equalized using a downlink channel estimation that is based on a reconstruction of the raw reference signal samples.

Some examples of the method, UEs, and non-transitory computer-readable medium described herein may further include operations, features, means, or instructions for generating the downlink channel estimation from the reconstruction of the raw reference signal samples and performing pre-equalization on the data signal using the downlink channel estimation generated from the reconstruction of the raw reference signal samples.

In some examples of the method, UEs, and non-transitory computer-readable medium described herein, the raw reference signal samples may be quantized raw reference signal samples and the downlink channel estimation may be generated based on the reconstruction of the quantized raw reference signal samples.

In some examples of the method, UEs, and non-transitory computer-readable medium described herein, the quantized raw reference signal samples may be quantized in accordance with one or more quantization schemes and the one or more quantization schemes include differential quantization, differential pulse coding modulation, Lloyd-Max quantization, time domain sample quantization, frequency domain sample quantization, or a combination thereof.

Some examples of the method, UEs, and non-transitory computer-readable medium described herein may further include operations, features, means, or instructions for transmitting, to the wireless device, a quantization configuration message indicating one or more quantization schemes to be applied to the raw reference signal samples, where the raw reference signal samples indicated by the sample message may be quantized in accordance with the one or more quantization schemes.

Some examples of the method, UEs, and non-transitory computer-readable medium described herein may further include operations, features, means, or instructions for transmitting a second pre-equalized data signal via a downlink slot, where the one or more downlink reference signals may be transmitted via the downlink slot without pre-equalization and without precoding.

Some examples of the method, UEs, and non-transitory computer-readable medium described herein may further include operations, features, means, or instructions for transmitting the second pre-equalized data signal includes transmitting the second pre-equalized data signal via one or more symbols of the downlink slot and the one or more downlink reference signals may be transmitted via one symbol of the downlink slot.

In some examples of the method, UEs, and non-transitory computer-readable medium described herein, frequency-division multiplex ports of the one or more downlink reference signals on resource elements of a resource block to produce frequency-division multiplexed downlink reference signals, where the frequency-division multiplexed downlink reference signals may be transmitted on the sidelink communication link via the resource elements of the resource block.

In some examples of the method, UEs, and non-transitory computer-readable medium described herein, transmitting the one or more downlink reference signals may include operations, features, means, or instructions for transmitting the one or more downlink reference signals on the sidelink communication link using a set of multiple ports mapped to the resource elements of the resource block with a frequency domain mapping having a density of at least six.

In some examples of the method, UEs, and non-transitory computer-readable medium described herein, transmitting the one or more downlink reference signals may include operations, features, means, or instructions for transmitting the one or more downlink reference signals on an orthogonal frequency-division multiplexing symbol without data multiplexing.

Some examples of the method, UEs, and non-transitory computer-readable medium described herein may further include operations, features, means, or instructions for transmitting a resource allocation message to the wireless device, the resource allocation message indicating an allocation of a set of downlink resources for the one or more downlink reference signals and an allocation of a set of uplink resources for the sample message indicating the raw reference signal samples, where the one or more downlink reference signals may be transmitted via the set of downlink resources and the sample message may be received via the set of uplink resources in accordance with the resource allocation message.

In some examples of the method, UEs, and non-transitory computer-readable medium described herein, the set of uplink resources for the sample message may be within a threshold time interval after the set of downlink resources for the one or more downlink reference signals.

Some examples of the method, UEs, and non-transitory computer-readable medium described herein may further include operations, features, means, or instructions for transmitting a second pre-equalized data signal via a first downlink slot, where the one or more downlink reference signals may be transmitted via a latter portion of the first downlink slot, and where the raw reference signal samples may be received via an uplink slot following the first downlink slot.

In some examples of the method, UEs, and non-transitory computer-readable medium described herein, the data signal may be transmitted via a second downlink slot after the uplink slot.

In some examples of the method, UEs, and non-transitory computer-readable medium described herein, the wireless device may be an extended reality device and the data signal may be indicative of video data.

In some examples of the method, UEs, and non-transitory computer-readable medium described herein, the one or more downlink reference signals include one or more DMRSs or one or more CSI-RSs.

A method for wireless communications at a wireless device is described. The method may include receiving, from a UE, one or more downlink reference signals via a sidelink communication link, transmitting, to the UE via the sidelink communication link, a sample message indicating raw reference signal samples of the one or more downlink reference signals, and receiving a data signal from the UE, where the data signal is pre-equalized in accordance with a downlink channel estimation that is based on a reconstruction of the raw reference signal samples.

A wireless device for wireless communications is described. The wireless device may include one or more memories storing processor executable code, and one or more processors coupled with the one or more memories. The one or more processors may individually or collectively be operable to execute the code to cause the wireless device to receive, from a UE, one or more downlink reference signals via a sidelink communication link, transmit, to the UE via the sidelink communication link, a sample message indicating raw reference signal samples of the one or more downlink reference signals, and receive a data signal from the UE, where the data signal is pre-equalized in accordance with a downlink channel estimation that is based on a reconstruction of the raw reference signal samples.

Another wireless device for wireless communications is described. The wireless device may include means for receiving, from a UE, one or more downlink reference signals via a sidelink communication link, means for transmitting, to the UE via the sidelink communication link, a sample message indicating raw reference signal samples of the one or more downlink reference signals, and means for receiving a data signal from the UE, where the data signal is pre-equalized in accordance with a downlink channel estimation that is based on a reconstruction of the raw reference signal samples.

A non-transitory computer-readable medium storing code for wireless communications is described. The code may include instructions executable by one or more processors to receive, from a UE, one or more downlink reference signals via a sidelink communication link, transmit, to the UE via the sidelink communication link, a sample message indicating raw reference signal samples of the one or more downlink reference signals, and receive a data signal from the UE, where the data signal is pre-equalized in accordance with a downlink channel estimation that is based on a reconstruction of the raw reference signal samples.

Some examples of the method, wireless devices, and non-transitory computer-readable medium described herein may further include operations, features, means, or instructions for quantizing the raw reference signal samples in accordance with one or more quantization schemes, where the sample message includes the quantized raw reference signal samples.

In some examples of the method, wireless devices, and non-transitory computer-readable medium described herein, the one or more quantization schemes include differential quantization, differential pulse coding modulation, Lloyd-Max quantization, time domain sample quantization, frequency domain sample quantization, or a combination thereof.

Some examples of the method, wireless devices, and non-transitory computer-readable medium described herein may further include operations, features, means, or instructions for receiving, from the UE, a quantization configuration message indicating the one or more quantization schemes to be applied to the raw reference signal samples, where the raw reference signal samples may be quantized in accordance with the one or more quantization schemes.

Some examples of the method, wireless devices, and non-transitory computer-readable medium described herein may further include operations, features, means, or instructions for receiving a second pre-equalized data signal via a downlink slot, where the one or more downlink reference signals may be received via the downlink slot without pre-equalization and without precoding.

Some examples of the method, wireless devices, and non-transitory computer-readable medium described herein may further include operations, features, means, or instructions for receiving the one or more downlink reference signals includes receiving frequency-division multiplexed downlink reference signals on the sidelink communication link via resource elements of a resource block.

In some examples of the method, wireless devices, and non-transitory computer-readable medium described herein, receiving the one or more downlink reference signals may include operations, features, means, or instructions for receiving the one or more downlink reference signals on the sidelink communication link based on a set of multiple ports mapped to the resource elements of the resource block with a frequency domain mapping having a density of at least six.

In some examples of the method, wireless devices, and non-transitory computer-readable medium described herein, receiving the one or more downlink reference signals may include operations, features, means, or instructions for receiving the one or more downlink reference signals on an orthogonal frequency-division multiplexing symbol without data multiplexing.

Some examples of the method, wireless devices, and non-transitory computer-readable medium described herein, receiving the second pre-equalized data signal includes receiving the second pre-equalized data signal via one or more symbols of the downlink slot and the one or more downlink reference signals may be received via one symbol of the downlink slot.

Some examples of the method, wireless devices, and non-transitory computer-readable medium described herein may further include operations, features, means, or instructions for receiving a resource allocation message from the UE, the resource allocation message indicating an allocation of a set of downlink resources for the one or more downlink reference signals and an allocation of a set of uplink resources for the sample message indicating the raw reference signal samples, where the one or more downlink reference signals may be received via the set of downlink resources and the sample message may be transmitted via the set of uplink resources in accordance with the resource allocation message.

In some examples of the method, wireless devices, and non-transitory computer-readable medium described herein, the set of uplink resources for the sample message may be within a threshold time interval after the set of downlink resources for the one or more downlink reference signals.

Some examples of the method, wireless devices, and non-transitory computer-readable medium described herein may further include operations, features, means, or instructions for receiving a second pre-equalized data signal via a first downlink slot, where the one or more downlink reference signals may be received via a latter portion of the first downlink slot, and where the raw reference signal samples may be transmitted via an uplink slot following the first downlink slot.

In some examples of the method, wireless devices, and non-transitory computer-readable medium described herein, the data signal may be received via a second downlink slot after the uplink slot.

In some examples of the method, wireless devices, and non-transitory computer-readable medium described herein, the wireless device may be an extended reality device and the data signal may be indicative of video data.

In some examples of the method, wireless devices, and non-transitory computer-readable medium described herein, the one or more downlink reference signals include one or more DMRSs or one or more CSI-RSs.

BRIEF DESCRIPTION OF THE DRAWINGS

FIGS. 16 through 19 show flowcharts illustrating methods that support channel estimation reference signals for pre-equalization in accordance with one or more aspects of the present disclosure.

DETAILED DESCRIPTION

Figure 1:
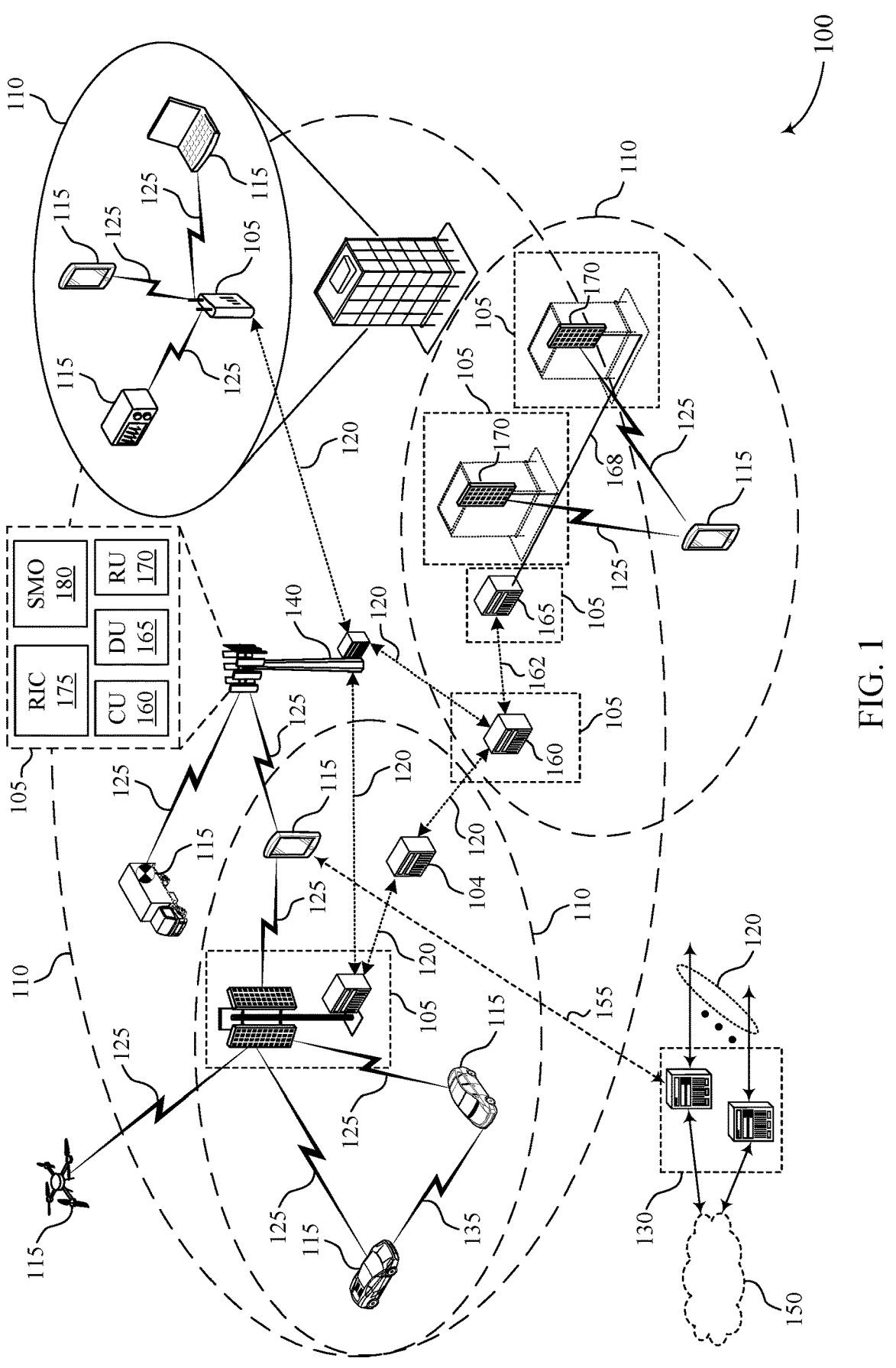
FIG. 1 shows an example of a wireless communications system that supports channel estimation reference signals for pre-equalization in accordance with one or more aspects of the present disclosure.

Extended reality (XR) is a technology with potential to become a leading product in the personal electronics segment in the next decade. In some examples, XR technology may include augmented reality (AR) technologies, virtual reality (VR) technologies, mixed reality (MR) technologies, among other examples. XR technology, however, still faces several challenges to be addressed before achieving increased commercialization and market penetration. Some of the challenges may include weight, processing complexity, and power consumption. For example, constrained battery weight, processing complexity, and power consumption provide significant challenges in view of the relatively heavy processing demands of some XR applications and services.

"Pre-equalization" as used herein may refer to a technique of processing a signal before it passes through a channel to reduce or eliminate Inter-Symbol Interference (ISI) and/or to improve channel characteristics. In some approaches, pre-equalization may rely on channel state information obtained by channel estimation processes. Usually, channel estimation processes may be performed at a receiving side, and accordingly equalization may be performed by a receiving device, resulting in increased processing complexity and power consumption of the receiving device. In some examples of the techniques described herein, an XR device may employ a processing/functionality split with a user equipment (UE). In such cases, transmit and receive processing complexity (e.g., physical layer-related or modem-related processing) may be shifted to the UE via a sidelink communication link. In such cases, performing transmit pre-equalization or precoding on the UE transmit side may reduce receive complexity and power consumption of the XR device, while enabling similar throughput or performance, without significant degradation, relative to receive-side equalization approaches. Such techniques, however, may assume that the UE has information of the channel experienced by the XR device and, in cases where channel reciprocity does not occur, computing and reporting channel state information (CSI) may result in increased processing at the XR device.

Some examples of the described techniques provide for reducing wireless device receiver complexity and power consumption when transmit pre-equalization is used or in cases without channel reciprocity. In some examples, CSI may be acquired by the UE based on samples of a downlink reference signal transmitted from the UE to a wireless device (e.g., peripheral device). Specifically, the wireless device (e.g., an XR device) may obtain samples of the downlink reference signal and report or indicate (e.g., transmit) the samples (e.g., raw samples) to the UE via an uplink transmission for downlink channel estimation evaluation. For example, the channel estimation reference signals may be sampled at the wireless device side, and CSI may be obtained using the samples signaled back to the UE by the wireless device. As such, the UE may perform channel estimation to obtain an estimation of a channel between the UE and the wireless device (e.g., to allow transmit pre-equalization procedures by the UE), thereby offloading channel estimation processes from the wireless device.

The described techniques may be supported by a channel estimation reference signal, such as a demodulation reference signal (DMRS) or a channel state information-reference signal (CSI-RS), which may be modified or extended. For example, to support a transmit pre-equalization scheme for highly frequency-selective channels, a relatively dense frequency domain pattern may be utilized for the channel estimation reference signal. The channel estimation reference signal may be decoupled from downlink data transmission in some cases, where pre-equalization may be evaluated or adjusted on the UE side for each downlink data transmission or before any downlink data transmission.

Some examples of the techniques described herein provide reference signal structures and related reference signal sample (e.g., raw CSI) indication procedures. Some examples of the reference signal may refer to aspects of DMRS or CSI-RS, such that CSI sampling procedures may be based on a relatively dense frequency domain pattern, may not have tight coupling to downlink data, and may be associated with (e.g., coupled with or accompanied by) the corresponding sampled reference signal (e.g., raw CSI) indication in an uplink signal. In some examples, the reference signal samples may be conveyed in association with an uplink data container similar to sidelink control information (SCI) part 2 and with relatively low latency (e.g., ultra-low latency). In some examples, a procedure for reference signal sample (e.g., raw CSI) indication or reporting may be utilized to reduce or preserve a relatively low or reasonable uplink signaling volume. To achieve a relatively low uplink signaling overhead or volume (of reference signal samples or raw CSI indications), a reference signal quantization scheme and/or a relatively low-complexity sample compression scheme may be applied.

Aspects of the disclosure are initially described in the context of wireless communications systems. Aspects of the disclosure are additionally described with reference to block diagrams, timing diagrams, and a process flow diagram. Aspects of the disclosure are further illustrated by and described with reference to apparatus diagrams, system diagrams, and flowcharts that relate to channel estimation reference signals for pre-equalization.

FIG. 1 shows an example of a wireless communications system 100 that supports channel estimation reference signals for pre-equalization in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or may have different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support channel estimation reference signals for pre-equalization as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140)

without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHZ to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some examples of the described techniques provide for reducing wireless device receiver complexity and power consumption when transmit pre-equalization is used or in cases without channel reciprocity. In some examples that employ a functionality split (e.g., XR functionality split), a wireless device (e.g., peripheral device, XR device) may function as a quasi-input/output (I/O) device, such that some wireless device receiver complexity may be shifted or moved to the UE 115 (e.g., the UE 115 may perform some features, processes, and/or aspects of wireless communications on behalf of the wireless device). For instance, one or more functions and/or components of a wireless device, including physical layer or modem related functions and/or components (e.g., channel estimation and equalization functions and/or circuitry for performing the same), may instead be implemented on a UE 115.

Some of the techniques described herein may enable some physical-layer receive components to be implemented with (or to operate with) relatively lower complexity, lower power, or lower latency. For example, implementing transmit pre-equalization on the UE 115 transmit side (instead of on the wireless device receive side, for instance) may help to reduce wireless device receiver complexity or power consumption.

Utilizing a transmit-side pre-equalization approach with related algorithmic and physical layer procedures may provide similar throughput or performance with reduced degradation or no degradation relative to receive-side equalization approaches in some scenarios. Transmit-side pre-equalization may utilize quasi-continuous CSI information for the channel. Quasi-continuous CSI information may be achieved for scenarios with or without channel reciprocity when one or more of the following transmission schemes or options are employed with a sidelink (e.g., XR sidelink or UE to XR link): a relatively low-latency time division duplex (TDD) pattern, full duplex, or subband full duplex. In some cases, a full duplex approach may provide ease of implementation in a case of a low-power short-range link (which may be applicable in the context of an XR sidelink via ultra-wideband (UWB) communication, for example).

In some approaches, channel information may be evaluated by sending a known reference signal (RS) from the transmit side to the receive side. One or more reference signals may be utilized, such as a DMRS or a CSI-RS (for 5G new radio (NR), for instance). In some examples, reference signal information may be transmitted via an established two-dimensional (2D) grid (e.g., a time domain (TD) and frequency domain (FD) grid).

CSI may be available at the UE 115 to enable transmit pre-equalization. A UE may obtain channel information in accordance with one or more of the following approaches. In a first approach, a UE may estimate the downlink channel (of a sidelink) from uplink channel information when reciprocity holds (where no channel estimation may be performed on the wireless device side). In a second approach, a wireless device may estimate the channel and may signal the estimate to the UE, where channel estimation is performed on the wireless device side (with concomitant increases in complexity and power consumption on the wireless device side). In a third approach, a wireless device may sample a downlink reference signal (of a sidelink) and may signal the (raw) reference signal samples back to the UE 115, where channel estimation is performed on the UE 115 side based on the reference signal samples, where no channel estimation is performed on wireless device side.

The third approach may be utilized in some examples of the techniques described herein. For instance, a transmit-side pre-equalization approach may be utilized to reduce complexity and power consumption at the wireless device receiver. A transmit-side pre-equalization approach may be useful in scenarios without channel reciprocity. For example, transmit-side pre-equalization may be utilized in cases of FDD or subband full duplex (SBFD) transmission schemes, which may be convenient options for XR sidelink via UWB (e.g., with 3.5 gigahertz (GHz) of available bandwidth and low-power transmission for simplifying FDD or SBFD implementation).

In some examples of the techniques described herein, CSI may be acquired on the UE 115 side based on samples of a downlink reference signal transmitted from the UE 115 to a wireless device (e.g., peripheral device). Specifically, the wireless device (e.g., an XR device, XR glasses, a UE, an IoT device, among other examples) may obtain samples of the downlink reference signal and report or indicate (e.g., transmit) the samples (e.g., raw samples) to the UE 115 via an uplink transmission for downlink channel estimation evaluation. For example, the reference signals may be sampled at the wireless device side and CSI may be obtained using the samples signaled back to the UE 115 by the wireless device. Accordingly, the UE 115 may perform channel estimation to allow transmit pre-equalization, thereby offloading channel estimation processes from the wireless device. With transmit pre-equalization, a channel estimation may not be utilized on the wireless device side. For example, the wireless device may not perform any receive-side equalization.

This procedure may be supported with a channel estimation reference signal, such as a DMRS or a CSI-RS. In some examples, the reference signal may be modified or extended. For example, a DMRS, which has a relatively dense pattern in the frequency domain, may be coupled with a data transmission (e.g., DMRS may not transmitted without being coupled with data). Moreover, DMRS may be precoded using the same precoding that is used for a data transmission that the DMRS is coupled with (which allows channel estimation including the precoding employed on the transmit side). Different DMRS ports or layers may be multiplexed via frequency-division multiplexing on different resources elements (REs) of the same orthogonal frequency-division multiplexing (OFDM) symbol.

In some examples of the techniques described herein, to support a transmit pre-equalization scheme for highly frequency-selective channels, a relatively dense frequency domain pattern may be utilized for the reference signal. This reference signal may be decoupled from downlink data transmission in some cases, where pre-equalization may be evaluated or adjusted on the UE side for each downlink data transmission or before any downlink data transmission.

CSI-RS may be utilized in some approaches in the downlink direction for evaluation of downlink link adaptation via reporting recommended downlink transmission parameters such as a modulation and coding scheme (MCS), precoding matrix, or for an indication of channel rank or quantity of layers (where the CSI report is signaled in the uplink).

CSI-RS, which may be allocated decoupled from data, may have a lower density grid in the frequency domain relative to DMRS. Because CSI-RS may be decoupled from data, CSI-RS may not be precoded (or pre-equalized) in the same way as data to allow for raw or un-precoded channel estimation.

To support a transmit-side pre-equalization scheme for frequency-selective channels (where UWB channel models are more frequency selective than typical Sub6 channel models, for example), a relatively dense frequency domain pattern may be utilized for the addressed reference signal (e.g., with a density similar to DMRS), while the reference signal may also be decoupled from downlink data transmission in some cases (e.g., similar to CSI-RS), since pre-equalization may be repeatedly evaluated or adjusted on the UE side for the next downlink data transmission or before downlink data transmission.

Some examples of the techniques described herein provide reference signal structures and related reference signal sample (e.g., raw reference signal sample) indication procedures. Some examples of the reference signal may refer to aspects of DMRS or CSI-RS, such that sampling procedures may be based on a relatively dense frequency domain pattern, may not have tight coupling to (e.g., may be decoupled from) downlink data, and may be associated with (e.g., coupled with or accompanied by) the corresponding sampled reference signal (e.g., raw sample) indication in an uplink signal. In some examples, the reference signal samples may be conveyed in association with an uplink data container similar to SCI part 2 and with relatively low latency (e.g., ultra-low latency). In some examples, a procedure for reference signal sample (e.g., raw CSI) indication or reporting may be utilized to reduce or preserve a relatively low or reasonable uplink signaling volume. To achieve a relatively low uplink signaling overhead or volume (of reference signal samples or raw CSI indications), a reference signal quantization scheme or a relatively low-complexity sample compression scheme may be applied.

In some examples, a reference signal allocation may indicate a corresponding resource reservation in the uplink for sample indication or reporting back to the UE. For instance, each reference signal allocation in the downlink may be associated with a sample indication in the uplink. Reduced (e.g., minimal) latency of the overall procedure may enhance the efficacy of transmit-side pre-equalization. In some examples, sample signaling may consume additional resources for each indication relative to a typical CSI report such that the indication may be addressed and conveyed as a part of uplink data with a more robust MCS. For example, signaling may be addressed similar to SCI part 2 in some approaches.

Some of the techniques described herein may define one or more reference signals, related reference signal samples (e.g., raw reference signal samples), and channel information indication procedures. In some approaches, previous DMRS or CSI-RS approaches may be modified. In some examples, sampling procedures may be based on a relatively dense frequency domain pattern, may not have tight coupling to downlink data, or may be coupled with (or accompanied by) the corresponding sampled reference signal (e.g., raw reference signal samples) in the uplink, which may be conveyed coupled with an uplink data container with relatively low latency (e.g., within a threshold quantity of symbols).

Some examples of the reference signals described herein may not be pre-equalized, may have a relatively dense frequency domain pattern, or may be allocated on an OFDM symbol in a downlink slot. Some examples of the reference signals described herein may be associated with an uplink indication (raw reference signal samples) and may be transmitted within a threshold quantity of symbols in the uplink (e.g., on the same or the next slot).

Some examples of the techniques described herein may reduce or preserve a relatively low uplink signaling volume. For low uplink signaling overhead or volume of raw reference signal samples, reference signal quantization or a sample compression scheme may be implemented. For OFDM, compression may be applied in the time domain, in the frequency domain, or both.

In some examples, for discrete Fourier transform-spread-orthogonal frequency division multiplexing (DFT-s-OFDM)

waveforms with relatively low complexity or a low power receiver, quantization or compression may be applied in the time domain (without quantization or compression in the frequency domain. For instance, fast Fourier transform (FFT) processing on the receive side may be avoided for these waveforms (e.g., an FFT and discrete Fourier transform (DFT) having identical size, and lack of channel estimation and equalization procedures may allow decoding time domain symbols directly).

In some examples of quantization, differential encoding with Max Lloyd quantization may be employed. Frequency and time correlation of in-phase and quadrature (I, Q) samples may be accounted for in this context (e.g., frequency domain sampling with reference signal pattern removal may provide quantization with increased efficiency).

Figure 2:
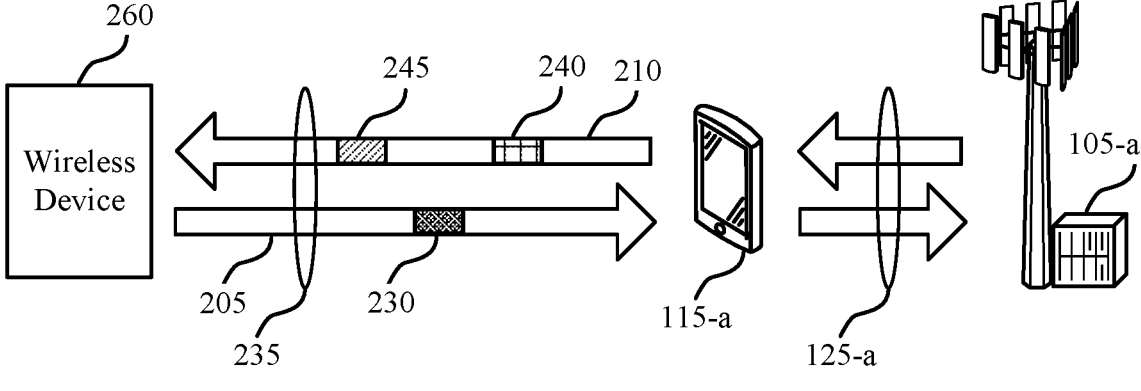
FIG. 2 shows an example of a wireless communication system that supports channel estimation reference signals for pre-equalization in accordance with one or more aspects of the present disclosure.
Figure 2:
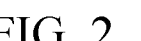

FIG. 2 shows an example of a wireless communications system 200 that supports channel estimation reference signals for pre-equalization in accordance with one or more aspects of the present disclosure. The wireless communications system 200 may implement aspects of or may be implemented by aspects of the wireless communications system 100. For example, the wireless communications system 200 includes a UE 115-*a*, which may be an example of a UE 115 described with respect to FIG. 1. The wireless communications system 200 also includes a network entity 105-*a*, which may be an example of a network entity 105 as described with respect to FIG. 1.

The UE 115-*a* may communicate with the network entity 105-*a* using a communication link 125-*a*, which may be an example of a communication link 125 described with respect to FIG. 1. The communication link 125-*a* may include a bi-directional link that enables both uplink and downlink network communications. For example, the UE 115-*a* may transmit uplink network transmissions, such as uplink control signals or uplink data signals, to the network entity 105-*a* using the communication link 125-*a*, and the network entity 105-*a* may transmit downlink network transmissions, such as downlink control signals or downlink data signals, to the UE 115-*a* using the communication link 125-*a*.

The wireless communications system 200 may include a wireless device 260. The wireless device 260 may be an electronic device including components for wireless communication. In some contexts, the wireless device 260 may be referred to as a peripheral device or a companion device relative to the UE 115-*a*. Examples of the wireless device 260 may include an XR headset (e.g., VR headset, AR headset, or the like), a UE, a tablet device, a laptop computer, a remote sensor (e.g., wireless camera, microphone, security sensor, doorbell camera, or moisture sensor, among other examples), a vehicle, a drone, or an IoT device, among other examples.

The UE 115-*a* may communicate with the wireless device 260 via a sidelink communication link 235. The sidelink communication link 235 may include bidirectional communications between the UE 115-*a* and the wireless device 260. For example, the sidelink communication link 235 may include one or more uplink signals 205 and one or more downlink signals 210. For instance, the one or more uplink signals 205 may include one or more uplink control signals or one or more uplink data signals from the wireless device 260 to the UE 115-*a*. The one or more downlink signals 210 may include one or more downlink control signals or one or more downlink data signals from the UE 115-*a* to the wireless device 260. In some examples, the communication link 135 described with respect to FIG. 1 may be an example of the sidelink communication link 235.

In some examples, the sidelink communication link 235 may operate with or without the communication link 125-*a* (e.g., may operate independently from the communication link 125-*a* or may operate in conjunction with the communication link 125-*a*). In some cases, the UE 115-*a* may relay one or more downlink signals from the network entity 105-*a* to the wireless device 260 via the sidelink communication link 235 or may relay one or more uplink signals from the wireless device 260 via the communication link 125-*a*. In some cases, the UE 115-*a* and the wireless device 260 may communicate via the sidelink communication link 235 independently of (or without operation of) the communication link 125-*a*.

The UE 115-*a* may transmit one or more downlink reference signals 245 to the wireless device 260 via the sidelink communication link 235. The one or more downlink reference signals 245 may include one or more pilot signals (e.g., pilot symbols) to allow channel estimation. In some cases, an initial transmission may be a downlink communication between the UE 115-*a* and the wireless device 260. For the initial downlink transmission, channel information may be unavailable. Accordingly, an initial reference signal transmission may be non-pre-equalized. In some approaches, usage of a pre-equalized reference signal may involve performing an equalization response removal to obtain a raw channel estimation (for a pre-equalization update, for example). A pre-equalized reference signal may complicate calculations, may not allow Tomlinson-Harashima precoding (THP) pre-equalization, or may cause noise enhancement when removing equalization. Accordingly, a non-pre-equalized reference signal may be utilized in accordance with some of the techniques described herein.

In some examples, the UE 115-*a* may transmit the one or more downlink reference signals 245 on an OFDM symbol without data multiplexing. For instance, the one or more downlink reference signals 245 may be transmitted without multiplexing the one or more downlink reference signals 245 with a data signal (e.g., any data signal(s) accompanying the one or more downlink reference signals 245). Avoiding data multiplexing with the one or more downlink reference signals 245 may allow straightforward sampling in the time domain or the frequency domain. Accordingly, the one or more downlink reference signals 245 may be decoupled from a data signal, if any.

Decoupling the one or more downlink reference signals 245 from a data signal may be accomplished in accordance with the following examples: a pre-equalized data signal (e.g., a data signal that is pre-equalized based on a previous channel state of the sidelink communication link 235) and one or more downlink reference signals may be communicated via a downlink slot, where the one or more downlink reference signals are communicated without pre-equalization and without precoding. For instance, before transmitting the data signal 240, the UE 115-*a* may transmit a second (e.g., previous) pre-equalized data signal (not shown in FIG. 2), which may be pre-equalized based on previous channel state of the sidelink communication link 235, via a downlink slot. The one or more downlink reference signals 245 may be transmitted via the downlink slot without pre-equalization and without precoding. In some examples, transmitting the second pre-equalized data signal may include transmitting the second pre-equalized data signal via one or more symbols of the downlink slot, where the one or more downlink reference signals 245 are transmitted via one symbol of the downlink slot. The wireless device 260 may receive the second pre-equalized data signal via the downlink slot, where the one or more downlink reference signals 245 are received via the downlink slot without pre-equalization and without precoding. In some examples, receiving the second pre-equalized data signal may include receiving the second pre-equalized data signal via one or more symbols of the downlink slot, where the one or more downlink reference signals 245 are received via one symbol of the downlink slot. Accordingly, the one or more downlink reference signals 245 may be decoupled from downlink data transmitted in the same downlink slot.

In some approaches, the UE 115-a may frequency-division multiplex ports of the one or more downlink reference signals 245 on resource elements of a resource block to produce frequency-division multiplexed downlink reference signals. The one or more downlink reference signals 245 (e.g., the frequency-division multiplexed downlink reference signals) may be transmitted (or received) on the sidelink communication link 235 via the resource elements of the resource block. For example, the UE 115-a may generate the one or more downlink reference signals 245 and transmit the one or more downlink reference signals via the sidelink communication link 235. A relatively high density reference signal allocation grid in the frequency domain may be utilized to enhance pre-equalization performance for frequency selective channels. For example, the UE 115-a may transmit (or the wireless device 260 may receive) the one or more downlink reference signals 245 on the sidelink communication link 235 using one or more ports mapped to the resource elements of the resource block with a frequency domain mapping having a density of at least six. Examples of port mappings are provided with reference to FIG. 5.

In some examples, the one or more downlink reference signals 245 may include one or more DMRSs or one or more CSI-RSs. For instance, a downlink reference signal 245 may be a modified DMRS or a modified CSI-RS.

While some DMRS pilot grids may provide a relatively high density frequency domain mapping (e.g., higher density than that of an unmodified CSI-RS), the DMRS may be coupled with data (e.g., precoded or pre-equalized similar to an accompanying data signal). In accordance with some of the techniques described herein, a modified DMRS may be utilized. The modified DMRS may be decoupled from downlink data or may be non-pre-equalized, while a downlink data transmission may be pre-equalized. Assuming a 2×2 MIMO transmission, for example, a downlink reference signal 245 may be allocated as a symbol (e.g., a single symbol) in a latter portion of a downlink slot (e.g., at the end of a downlink slot following downlink data allocation) or on any symbol index in a downlink slot in general.

While some CSI-RS pilot grids may utilize a non-precoded or non-pre-equalized pilot, some CSI-RS grid options may have a lower density in the frequency domain than DMRS. In accordance with some of the techniques described here, a modified CSI-RS may be utilized. The modified CSI-RS may have a pilot grid with increased density in the frequency domain. Assuming 2×2 MIMO transmission, for example, a downlink reference signal 245 may be allocated as a symbol (e.g., a single symbol) in a latter portion of a downlink slot (e.g., at the end of downlink slot following downlink data allocation) or on any symbol index in a downlink slot in general.

The wireless device 260 may receive the one or more downlink reference signals 245 via the sidelink communication link 235. For example, the wireless device 260 may receive the one or more downlink reference signals 245 on an orthogonal frequency-division multiplexing symbol without data multiplexing.

The wireless device 260 may sample the one or more downlink reference signals 245 to obtain one or more raw reference signal samples. As used herein, a "raw reference signal sample" may be a sample or measure of a reference signal without performing channel estimation (e.g., without calculating channel fading, channel gain, signal-to-noise ratio (SNR), or spatial correlation). For example, a raw reference signal sample may indicate or represent the amplitude or magnitude of a received reference signal. In some examples, a "raw sample" may refer to a digitized version of an analog signal. In some examples, the one or more downlink reference signals 245 and/or the raw reference signal samples may not be pre-equalized. The wireless device 260 may, in some cases, quantize the sampled downlink reference signals 245.

The wireless device 260 may transmit (to the UE 115-a via the sidelink communication link 235) a sample message 230 indicating raw reference signal samples of the one or more downlink reference signals 245. For instance, the wireless device 260 may generate a sample message 230 indicating the raw reference signal samples and may transmit the sample message 230 to the UE 115-a.

In some examples, the wireless device 260 may quantize the raw reference signal samples in accordance with one or more quantization schemes. The sample message 230 may include the quantized raw reference signal samples. For example, raw reference signal sample (e.g., "raw CSI") compression may be utilized to reduce uplink signaling volume and resource consumption (e.g., to reduce overhead signaling). In some examples, a UWB signal may have a relative high bandwidth (e.g., 500 MHz or more). A UWB channel may be frequency selective, where a relatively dense frequency domain pattern of reference signals may be useful for channel estimation. Accordingly, a relatively high sampling rate or relatively large quantity of samples may be utilized to characterize the addressed signal bandwidth. Each raw reference signal sample may be quantized with a reduced or minimum bit representation (per I, Q) to enhance performance (due to noisy channel estimation).

Quantization or sample compression may reduce the binary representation of the raw reference signal samples. Quantization or sample compression may reduce uplink resource volume, overhead, or related transmit power consumption.

In some approaches, the one or more quantization schemes may include differential quantization, differential pulse coding modulation, Lloyd-Max quantization, time domain sample quantization, frequency domain sample quantization, or a combination thereof. Some examples of a quantization scheme that may be utilized may include differential quantization, assuming some correlation of the reference signal samples. For instance, differential pulse coding modulation (DPCM) may be utilized. Differential quantization may provide a more compact distribution, which may allow reference signal samples to be represented with reduced length. Some examples of differential quantization may employ a Lloyd-Max quantizer. The Lloyd-Max quantizer may be a non-uniform quantizer based on sample distribution.

Time domain sample quantization is an example of a quantization scheme that may be utilized. Time domain sample quantization may allow avoiding performing an FFT operation on wireless device 260 side for reference signal sampling procedures. In some cases, time domain sample quantization may not permit separating reference signal ports and removal of an associated pattern. In some cases, time domain sample correlation may be less than frequency domain sample correlation, which may reduce the performance of differential coding or quantization. In some cases, time domain quantization for OFDM may suffer from a relatively higher peak-to-average power ratio (PAPR) and may consume a relatively greater quantity of representation bits for some scenarios.

Frequency domain samples, after pattern removal, may be correlative such that differential frequency domain samples (after pattern removal) may provide a more localized distribution (relative to raw time domain samples), for example, by exploiting frequency domain correlation of the channel. Frequency domain samples may allow a more efficient Lloyd-Max quantization. Accordingly, differential quantization may enhance performance with frequency domain samples.

In some examples, a Lloyd-Max quantizer may be employed in a time domain sample case, in a frequency domain sample case, or in both cases. For instance, a Lloyd-Max quantizer may be employed because time domain and differential frequency domain samples (after pattern removal) may have a non-uniform (or an approximated Gaussian) distribution for a frequency selective channel.

In some examples, the wireless device 260 may apply differential quantization per channel estimation reference signal port, per receive antenna, or per in-phase and quadrature (I/Q) separately after reference signal pattern removal. In some approaches, a quantization output (e.g., quantized differential residual) may be passed through an entropy encoder (e.g., a relatively low complexity entropy encoder) for enhanced bit compression on the wireless device 260 receive side. In these approaches, a corresponding entropy decoder may be implemented on the UE 115-*a* transmit side for reconstruction.

In some examples, the UE 115-*a* may transmit, to the wireless device 260, a quantization configuration message (not shown in FIG. 2). the wireless device 260 may receive the quantization configuration message. The quantization configuration message may indicate the one or more quantization schemes to be applied to the raw reference signal samples. For example, the quantization configuration message may indicate one or more of the quantization schemes described herein. The raw reference signal samples may be quantized in accordance with the one or more quantization schemes.

The UE 115-*a* may receive, from the wireless device 260 via the sidelink communication link 235, the sample message 230 indicating raw reference signal samples of the one or more downlink reference signals 245. For example, the sample message 230 may indicate the raw reference signal samples with or without quantization. For instance, the raw reference signal samples may be quantized raw reference signal samples that are quantized in accordance with one or more of the quantization schemes described herein. Additional details regarding some examples of quantization schemes that may be utilized in accordance with some examples of the techniques described herein are given with reference to FIG. 3 and FIG. 4.

The UE 115-*a* may reconstruct the raw reference signal samples from the sample message 230. For example, the UE 115-*a* may perform entropy decoding, I/Q sample reconstruction, differential decoding, or a combination thereof to reconstruct the raw reference signal samples.

In some approaches, applying channel estimation on the UE 115-*a* side while preserving a reduced complexity receiver on the wireless device 260 (under a no reciprocity scenario, for example) may be based on the one or more downlink reference signal samples that are sampled on the wireless device 260 side and signaled back to the UE 115-*a*. In some examples, the UE 115-*a* may generate a downlink channel estimation from the reconstruction of the raw reference signal samples. For example, the UE 115-*a* may perform downlink channel estimation based on the raw reference signal samples (e.g., based on the reconstruction of the raw reference signal examples) to generate a downlink channel estimation. In some approaches, the raw reference signal samples are quantized raw reference signal samples and the downlink channel estimation is generated based at least in part on the reconstruction of the quantized raw reference signal samples.

For example, the UE 115-*a* may determine or calculate one or more downlink channel characteristics (e.g., channel fading, channel gain, SNR, channel transfer function, spatial correlation, group delay, or phase delay, among other examples) based on the raw reference signal samples. In some approaches, least square (LS) or minimum mean square error (MMSE) channel estimation may be performed to generate the downlink channel estimation. The downlink channel estimation may characterize the downlink channel (e.g., fading and delay experienced by the one or more downlink reference signals 245).

The UE 115-*a* may determine a pre-equalizer (e.g., pre-equalization filter) based on the channel estimation. The pre-equalizer may at least partially compensate for some of the characteristics of the channel. In some examples, the pre-equalizer may be calculated to produce a flat channel response (e.g., to compensate for channel fading, group delay, phase delay, or noise, among other examples). For instance, the UE 115-*a* may calculate the pre-equalizer as an inverse filter relative to the channel estimation.

The UE 115-*a* may transmit a data signal 240 to the wireless device 260. The data signal 240 may be pre-equalized using the downlink channel estimation that is based at least in part on the reconstruction of the raw reference signal samples. In some examples, the UE 115-*a* may perform pre-equalization on the data signal 240 using the downlink channel estimation generated from the reconstruction of the raw reference signal samples. For instance, the UE 115-*a* may apply the pre-equalizer (e.g., pre-equalization filter) to the data signal 240. The wireless device 260 may receive the data signal 240 from the UE 115-*a*, where the data signal 240 is pre-equalized in accordance with the downlink channel estimation that is based on the reconstruction of the raw reference signal samples.

In some examples, the data signal 240 may be generated from data sourced from the UE 115-*a*, from the network entity 105-*a*, or both. For instance, the network entity 105-*a* may send data (e.g., voice, video, text, streaming data, driving control data, game data, or Internet data, among other examples). The UE 115-*a* may pre-equalize the data from the network entity 105-*a* to produce the data signal 240. In some examples, the data signal 240 may be generated from data stored on the UE 115-*a*. For instance, the UE 115-*a* may utilize data (e.g., voice, video, text, streaming data, driving control data, or game data, among other examples) stored on the UE 115-*a* or generated on the UE 115-*a*. The UE 115-*a* may pre-equalize the data from the UE 115-*a* to generate the data signal 240.

The wireless device 260 is an XR device and the data signal 240 is indicative of video data in some examples. For instance, the UE 115-*a* may send video data to the wireless device 260 (e.g., an XR device with one or more displays) for display on the wireless device 260.

In some examples, before transmitting the data signal 240, the UE 115-a may transmit a second (e.g., previous) pre-equalized data signal via a first downlink slot. The wireless device 260 may receive the second pre-equalized data signal via the first downlink slot. The one or more downlink reference signals 245 may be transmitted (or received) via a latter portion of the first downlink slot (e.g., within 2, 3, 4, 5, or another quantity of symbols from the end of the downlink slot). The raw reference signal samples may be transmitted (via the sample message 230 from the wireless device 260) via an uplink slot following the first uplink slot. At the UE 115-a, the raw reference signal samples may be received (via the sample message 230, for example) via the uplink slot following the first downlink slot. The data signal 240 may be transmitted (from the UE 115-a) via a second downlink slot after the uplink slot. The wireless device 260 may receive the data signal 240 via the second downlink slot after the uplink slot.

The UE 115-a may transmit a resource allocation message (not shown in FIG. 2) to the wireless device 260. The wireless device 260 may receive the resource allocation message from the UE 115-a. The resource allocation message may indicate an allocation of a set of downlink resources for the one or more downlink reference signals 245 and an allocation of a set of uplink resources for the sample message 230 indicating the raw reference signal samples. At the UE 115-a, the one or more downlink reference signals 245 may be transmitted via the set of downlink resources and the sample message 230 may be received via the set of uplink resources in accordance with the resource allocation message. At the wireless device 260, the one or more downlink reference signals 245 may be received via the set of downlink resources and the sample message 230 may be transmitted via the set of uplink resources in accordance with the resource allocation message. For example, the allocation message indicating the set of downlink resources may also indicate a set of corresponding uplink resources for the raw reference signal samples. The set of uplink resources for the sample message 230 may be within a threshold time interval after the set of downlink resources for the one or more downlink reference signals 245. For example, the downlink resources and the uplink resources may be allocated to be within a threshold period in time (e.g., within a time gap of 2, 3, 4, 5, or another quantity of symbols, or another period in time). In some examples, the resource allocation may be performed according to the quantity of allocated downlink reference signal resource elements on involved ports and a quantity of receive antennas on wireless device 260 side. An example of resource scheduling is provided with reference to FIG. 6.

Figure 3:
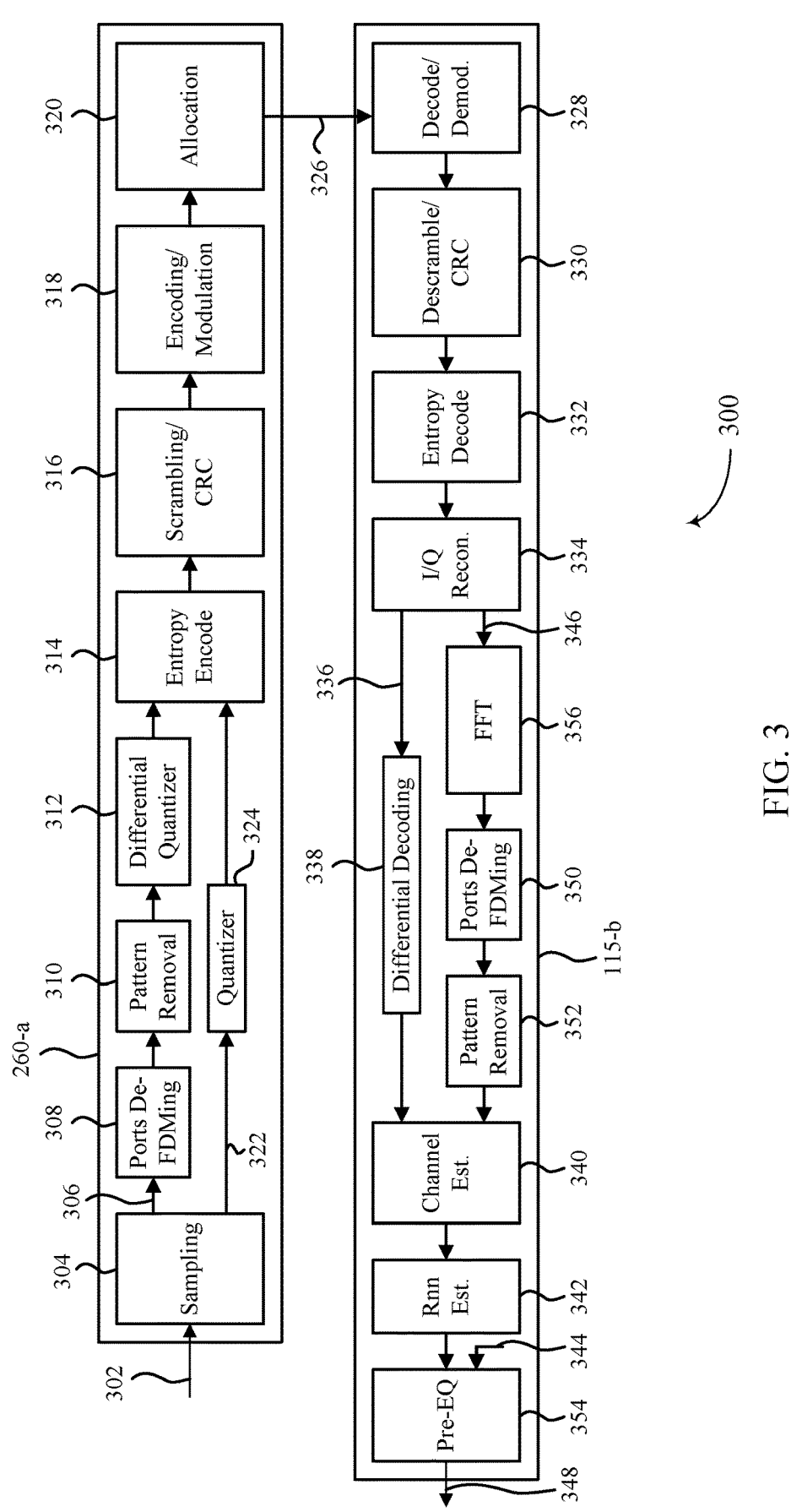
FIG. 3 shows an example of a block diagram that supports channel estimation reference signals for pre-equalization in accordance with one or more aspects of the present disclosure.

FIG. 3 shows an example of a block diagram 300 that supports channel estimation reference signals for pre-equalization in accordance with one or more aspects of the present disclosure. In particular, FIG. 3 illustrates an example of a wireless device 260-a and a UE 115-b. The wireless device 260-a may be an example of aspects of a wireless device 260 as described herein. The wireless device 260-a may include one or more components as illustrated in FIG. 3. The wireless device 260-a, or one or more components of the wireless device 260-a may include one or more circuitries (e.g., at least one processor, which may be coupled with at least one memory) to support the described techniques. The UE 115-b may be an example of aspects of a UE 115 as described herein. The UE 115-b may include one or more components as illustrated in FIG. 3. The UE 115-b, or one or more components of the UE 115-b may include one or more circuitries (e.g., at least one processor, which may be coupled with at least one memory) to support the described techniques. In some examples, one or more of the functions or operations described with reference to FIG. 3 may be performed in accordance with the description of one or more of FIG. 2 or FIGS. 4-19.

In accordance with some examples of the techniques described herein, sampling one or more downlink reference signals on the wireless device 260-a to generate raw reference signal samples or signaling the raw reference signal samples back to the UE 115-b may be performed via the time domain, the frequency domain, or a combination thereof.

In the example of FIG. 3, the wireless device 260-a receives one or more downlink reference signals 302 from the UE 115-b via a sidelink communication link. A sampling component 304 samples the one or more downlink reference signals to generate samples. In some examples, the sampling component 304 may obtain frequency domain samples 306, time domain samples 322, or a combination thereof.

In a case of frequency domain samples 306, the frequency domain samples 306 may be provided to a ports frequency division demultiplexing (ports de-FDMing) component 308. The ports de-FDMing component 308 may perform frequency division demultiplexing on the frequency domain samples 306. A pattern removal component 310 may perform pattern removal on the frequency domain samples 306 to produce raw reference signal samples. A differential quantizer component 312 may perform differential quantization on the raw reference signal samples to generate quantized raw reference signal samples.

For a discrete Fourier transform-spread-orthogonal frequency division multiplexing (DFT-s-OFDM) waveform, the wireless device 260-a may not perform an FFT operation to reduce complexity and power consumption on the wireless device 260-a side. In some examples (e.g., in the context of some examples of downlink reference signal acquisition procedures), the DFT-S-OFDM waveform may be restricted to time-domain based reference signal sampling only.

In some cases, the time domain samples 322 may be raw reference signal samples. For example, raw reference signal sampling may be performed in the time domain to avoid an FFT operation on the reference signal symbol on the wireless device 260-a side for a reference signal acquisition procedure. In this case, the time domain signal may be sampled at a relatively low rate based on an FFT size used for reference signal generation. In some approaches, no data multiplexing may be performed with the reference signal on the same OFDM symbol. The reference signal resource elements may be boosted according to a density factor if a frequency domain allocation density per port is less than 6 (assuming a 2-port allocation, for example). For this scenario, a single time domain replica may be taken of the reference signal for a channel estimation procedure to reduce the amount of signaling in UL samples. For instance, a full resolution frequency domain response may be reconstructed on the UE 115-b side. A quantizer component 324 may perform quantization on the raw reference signal samples to generate quantized raw reference signal samples.

An entropy encode component 314 may perform entropy encoding on the quantized raw reference signal samples (for the time domain sample approach, the frequency domain sample approach, or a combination thereof). A scrambling/CRC component 316 may perform scrambling or add a CRC code to the quantized raw reference signal samples. An encoding/modulation component 318 may perform encoding or modulation on the quantized raw reference signal samples. An allocation component 320 may allocate communication resources (e.g., resource elements) for the transmission of the quantized raw reference signal samples.

The wireless device 260-a may transmit a sample message 326 including the quantized raw reference signal samples to the UE 115-b. A decode/demodulation component 328 may decode or demodulate the sample message 326. A descramble/CRC component 330 may descramble the sample message 326 or remove the CRC code based on the sample message 326. An entropy decode component 332 may perform entropy decoding based on the sample message 326. An I/Q reconstruction component 334 may reconstruct the quantized raw reference signal samples based on the sample message 326 to obtain reconstructed quantized raw reference signal samples.

In a case of frequency domain reconstructed quantized raw reference signal samples 336, a differential decoding component 338 may perform differential decoding on the frequency domain reconstructed quantized raw reference signal samples 336.

In a case of time domain reconstructed quantized raw reference signal samples 346, an FFT component 356 may perform an FFT on the time domain reconstructed quantized raw reference signal samples 346. A ports de-FDMing component 350 may perform frequency division de-multiplexing based on the time domain reconstructed quantized raw reference signal samples 346. A pattern removal component 352 may perform pattern removal based on the time domain reconstructed quantized raw reference signal samples 346.

A channel estimation component 340 may perform channel estimation based on the reconstructed quantized raw reference signal samples to generate a channel estimation (e.g., based on frequency domain and/or time domain quantized reference signal samples that are delivered from the wireless device 260-a to the UE 115-b and reconstructed). An $R_{nn}$ estimation component 342 may estimate a noise covariance matrix $R_{nn}$ (e.g., a coarse interference covariance matrix) based on the reconstructed quantized raw reference signal samples.

A pre-equalization component 354 may apply pre-equalization to a data signal 344 to generate a pre-equalized data signal 348. In some examples, the pre-equalization may be based on a MMSE criterion (e.g., linear transmit-MMSE or nonlinear THP-MMSE), where the noise covariance matrix $R_{nn}$ may be utilized to evaluate the pre-equalization. For instance, in transmit-MMSE, the pre-equalization term $P=H'^*(H^*H'+R_{nn})^{-1}$, where H denotes the channel estimation. The UE 115-b may transmit the pre-equalized data signal 348 to the wireless device 260-a. For example, the pre-equalized data signal 348 may be transmitted to the wireless device 260-a via a sidelink communication link.

Some examples of the compression techniques described herein may account for time and frequency selective interference. In some approaches where an interference-related characterization is available to the UE 115-b (e.g., where narrow band interference channel partially overlaps with an UWB signal or interference activity pattern), the UE 115-b may dynamically determine whether to apply differential quantization or other quantization (e.g., non-differential quantization), a binary representation per I/Q sample to use, or a compandor function to use for a Lloyd-Max quantizer (from a set of options). For instance, interference information may be utilized to determine whether or not to utilize differential quantization, where differential quantization may rely on the interference information.

In some examples, time domain data samples may have a relatively larger range than frequency domain data samples due to a relatively higher PAPR. Differential frequency domain data samples may have a centralized distribution, whereas differential time domain data samples may be distributed with a Gaussian distribution (with an increased variance) due to uncorrelated time domain data samples. In some examples, utilizing reference signal quantization in the time domain saves an FFT operation on the wireless device side. Frequency domain data samples after pattern removal may be relatively more correlated, and therefore may allow using a reduced quantized data representation, hence using fewer bits. For an OFDM waveform via an UWB channel with 4K FFT size for a transmit minimum mean squared error (MMSE) pre-equalization scheme, a 1-bit differential quantization scheme may achieve similar performance to a 5-bits quantization scheme with less uplink overhead. In some aspects, reducing the quantization level may lead to an approximately seven times overhead reduction.

Figure 4:
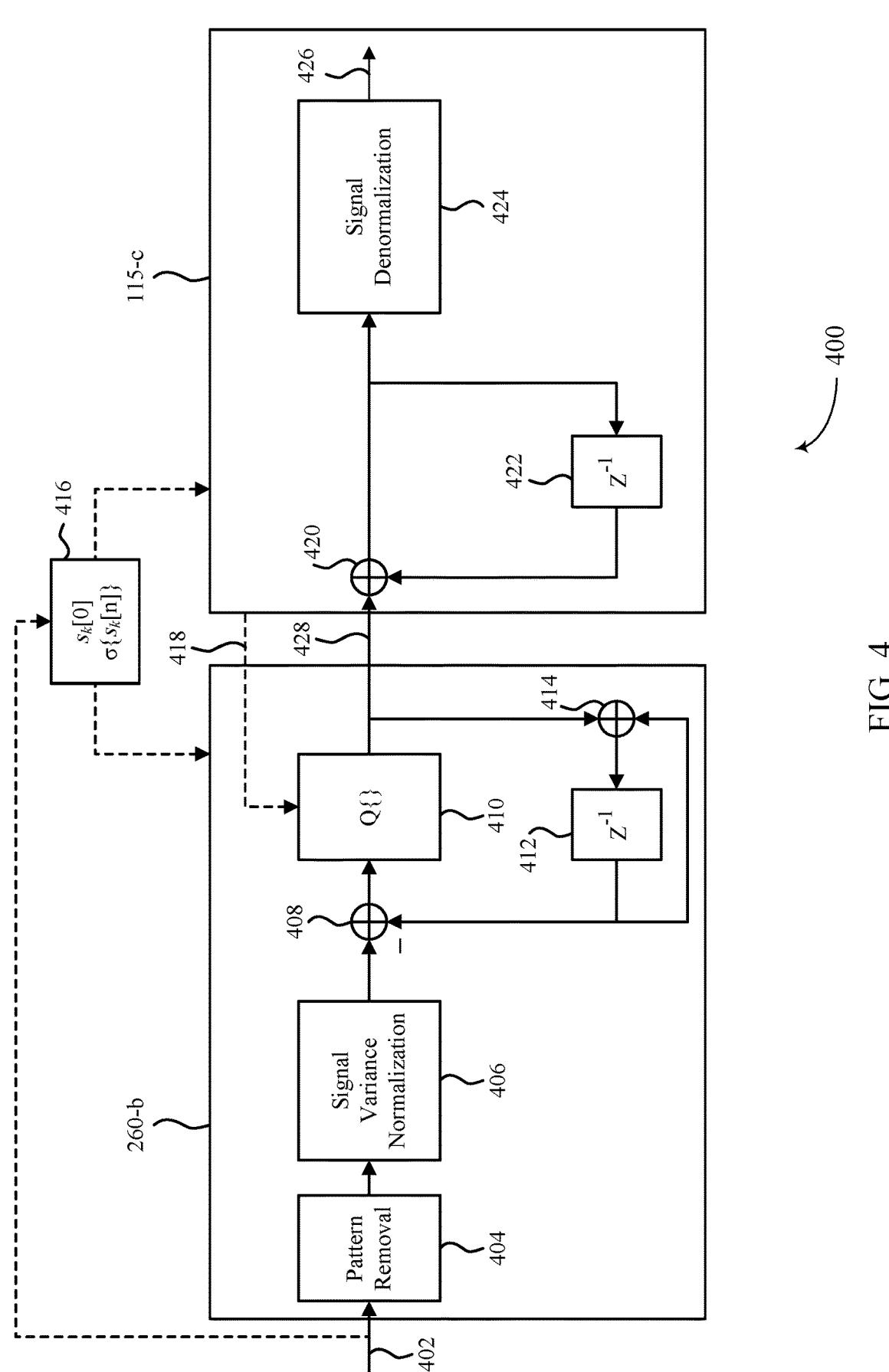
FIG. 4 shows an example of a block diagram that supports channel estimation reference signals for pre-equalization in accordance with one or more aspects of the present disclosure.

FIG. 4 shows an example of a block diagram 400 that supports channel estimation reference signals for pre-equalization in accordance with one or more aspects of the present disclosure. In particular, FIG. 4 illustrates an example of a differential quantizer diagram for frequency domain samples, including a wireless device 260-b and a UE 115-c. The wireless device 260-b may be an example of aspects of a wireless device 260 as described herein. The wireless device 260-b may include one or more components as illustrated in FIG. 4. The wireless device 260-b, or one or more components of the wireless device 260-b may include one or more circuitries (e.g., at least one processor, which may be coupled with at least one memory) to support the described techniques. The UE 115-c may be an example of aspects of a UE 115 as described herein. The UE 115-c may include one or more components as illustrated in FIG. 4. The UE 115-c, or one or more components of the UE 115-c may include one or more circuitries (e.g., at least one processor, which may be coupled with at least one memory) to support the described techniques. In some examples, one or more of the functions or operations described with reference to FIG. 4 may be performed in accordance with the description of one or more of FIGS. 2-3 or FIGS. 5-19.

In the example of FIG. 4, the wireless device 260-b receives a downlink reference signal 402 ($s_k[n]$) from the UE 115-b via a sidelink communication link. The downlink reference signal 402 ($s_k[n]$) is a raw downlink reference signal in the frequency domain corresponding to the $k^{th}$ port for sample n. As illustrated in FIG. 4, characteristics 416 of the downlink reference signal are shared between the wireless device 260-b and the UE 115-c. For example, wireless device 260-b may share an initial sample value ($s_k[0]$) of the downlink reference signal and an estimated standard deviation ($\sigma_{s_k}$) of the downlink reference signal to scale the variance of the downlink reference signal 402 to a fixed value (e.g., 1). The wireless device 260-a may estimate data variance per session, per port, and per reception.

A pattern removal component 404 removes a pattern from the downlink reference signal 402. A signal variance normalization 406 normalizes a signal variance to produce a normalized signal $x_k[n]$. A first adder 408 subtracts a first delayed signal $y_k[n-1]$ from the normalized signal $x_k[n]$ to produce an error signal $e_k[n]$. A Lloyd-Max quantizer 410 ($Q\{\cdot\}$) quantizes the error signal $e_k[n]$ to produce a quantized raw downlink reference signal sample 428 ($\hat{d}_k[n]$). The Lloyd-Max quantizer 410 may operate based on the differential samples' distribution. In some examples, the Lloyd-Max quantizer 410 may be implemented with a compandor function. The UE 115-c may send a quantizer configuration message 418 to configure the Lloyd-Max quantizer 410. In some approaches, the quantizer configuration message 418 may indicate a compandor configuration. For instance, the Lloyd-Max quantizer 410 may utilize a compressor function, a uniform quantizer function, and an expander function to generate the quantized raw downlink reference signal sample 428 ($\hat{d}_k[n]$).

As illustrated in FIG. 4, the quantized raw downlink reference signal sample 428 ($\hat{d}_k[n]$) is provided to a second adder 414 and is transmitted to the UE 115-*c*. The second adder 414 adds the first delayed signal $y_k[n-1]$ to the quantized raw downlink reference signal sample 428 ($\hat{d}_k[n]$) to produce a first output signal $y_k[n]$. A first delay 412 (e.g., a predictor) may delay the first output signal $y_k[n]$ to generate the first delayed signal $y_k[n-1]$. In some examples, the first adder 408, the Lloyd-Max quantizer 410, the second adder 414, and the first delay 412 may be an example of DPCM.

At the UE 115-*c*, a third adder 420 may add the quantized raw downlink reference signal sample 428 ($\hat{d}_k[n]$) to a second delayed signal $y_k[n-1]$ to generate a second output signal $y_k[n]$. The second output signal $y_k[n]$ may be provided to a signal denormalization component 424 and a second delay 422. The second delay 422 may produce the second delay signal $y_k[n-1]$. The signal denormalization component 424 may provide a reconstructed output sample 426 ($\hat{s}_k[n]$) (e.g., an output of a quantization/dequantization procedure).

Figure 5:
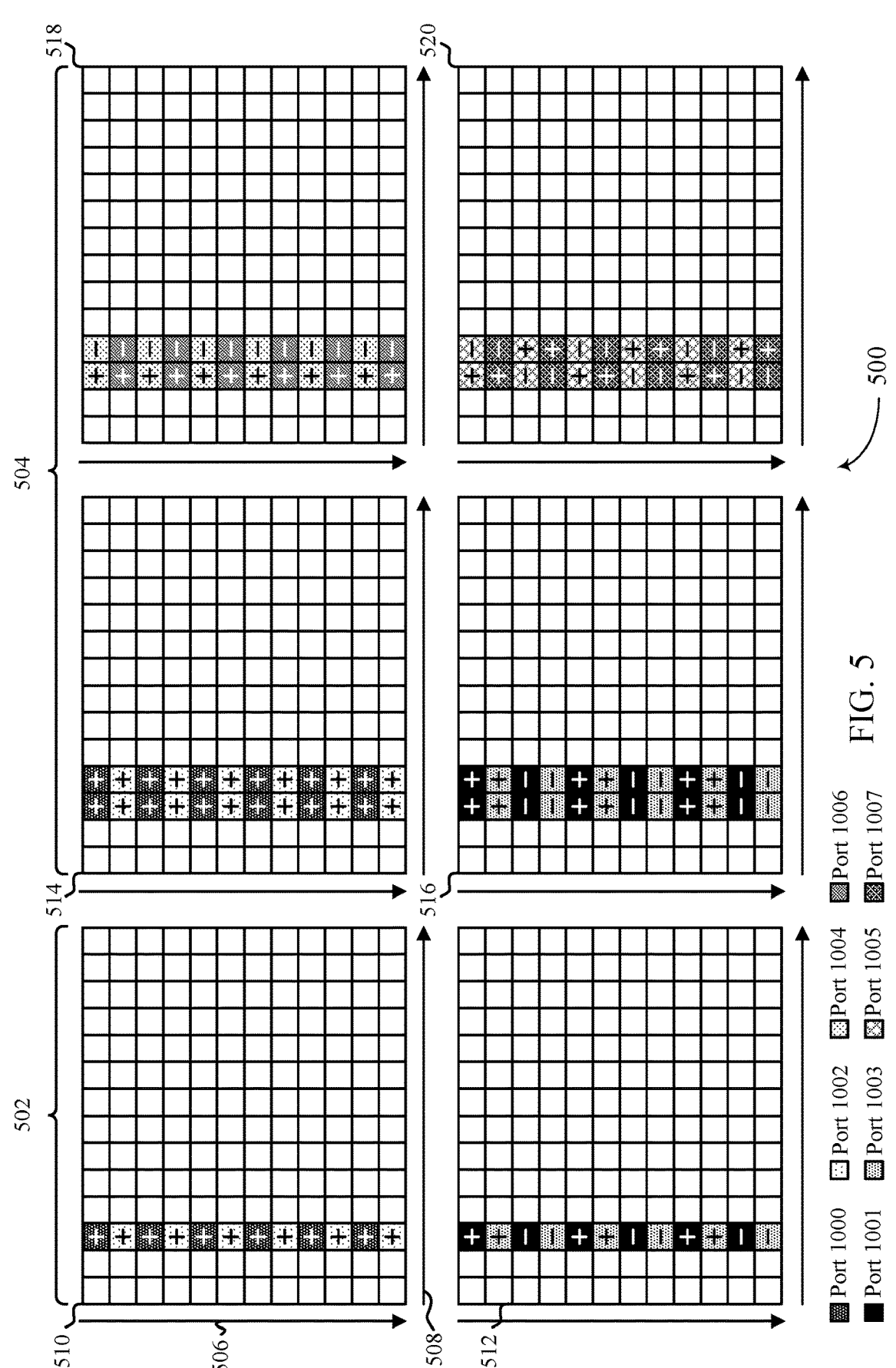
FIG. 5 shows an example of a diagram illustrating examples of reference signal patterns that support channel estimation reference signals for pre-equalization in accordance with one or more aspects of the present disclosure.

FIG. 5 shows an example of a diagram 500 illustrating examples of reference signal patterns that support channel estimation reference signals for pre-equalization in accordance with one or more aspects of the present disclosure. In particular, FIG. 5 illustrates examples of one-OFDM-symbol patterns 502 and examples of two-OFDM-symbol patterns 504. Each of the symbol patterns is illustrated in subcarriers 506 (e.g., subcarrier index) relative to OFDM symbols 508 (e.g., OFDM symbol index).

In some examples, a DMRS frequency domain mapping may be utilized with a type 1 configuration, with one DMRS symbol and two DMRS ports frequency-division multiplexed on the DMRS symbol. The one-OFDM-symbol patterns 502 have DMRS starting positions on OFDM symbol 2. As illustrated in FIG. 5, the first reference signal pattern 510 includes ports 1000 and 1002 multiplexed on OFDM symbol 2. In some examples, the starting position for DMRS may be OFDM symbol 2 or 3. As illustrated in FIG. 5, a second reference signal pattern 512 includes ports 1001 and 1003 multiplexed on OFDM symbol 2. The one-OFDM-symbol patterns 502 may be utilized for 2×2 MIMO support for a wireless device via UWB and may be modified DMRS patterns.

The two-OFDM-symbol patterns 504 may include reference signal patterns with reference signals mapped to ODFM symbols 2 and 3. For example, a third reference signal pattern 514 includes ports 1000 and 1002 multiplexed on OFDM symbols 2 and 3. A fourth reference signal pattern 516 includes ports 1001 and 1003 multiplexed on OFDM symbols 2 and 3. A fifth reference signal pattern 518 includes ports 1004 and 1006 multiplexed on OFDM symbols 2 and 3. A sixth reference signal pattern 520 includes ports 1005 and 1007 multiplexed on OFDM symbols 2 and 3.

Some CSI-RS patterns for 2×2 MIMO with 2 ports may supports two frequency domain mappings, which may have insufficiently low density per port for channel estimation for transmit pre-equalization (e.g., 1 resource element per resource block or 2 resource elements per 2 resource blocks). In some examples of the techniques described herein, downlink reference signals may be based on CSI-RS with an increased density of at least six in a frequency domain mapping for a two-port reference signal allocation (which may provide similar patterns as the patterns of the DMRS examples provided in FIG. 5.

Figure 6:
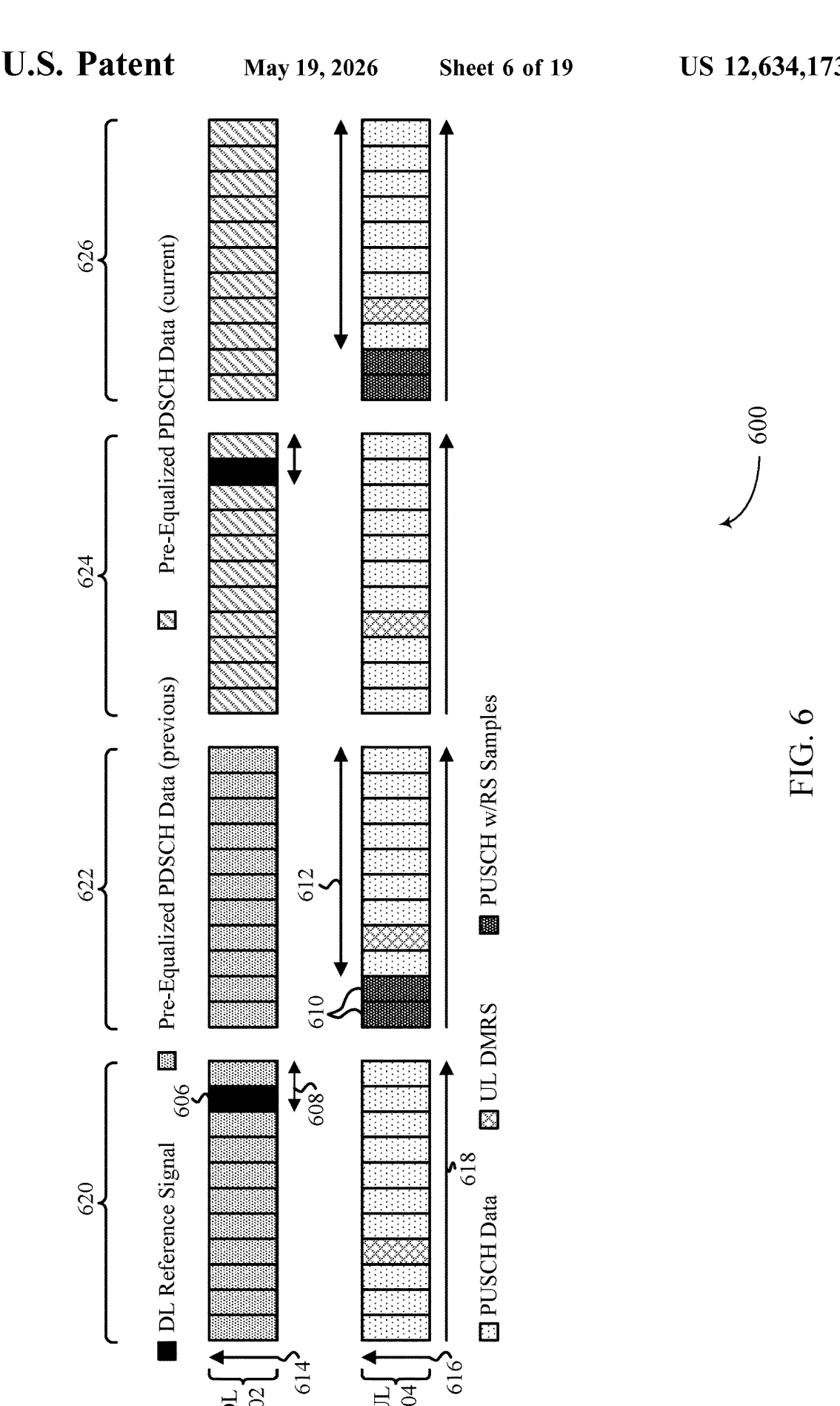
FIG. 6 shows an example of a diagram of a frequency division duplexing (FDD) scenario that supports channel estimation reference signals for pre-equalization in accordance with one or more aspects of the present disclosure.

FIG. 6 shows an example of a diagram 600 of an FDD scenario that supports channel estimation reference signals for pre-equalization in accordance with one or more aspects of the present disclosure. FIG. 6 illustrates a downlink channel 602 (from a UE to a wireless device) and an uplink channel 604 (from a wireless device to a UE). The downlink channel 602 is illustrated in a first resource element index 614 relative to an OFDM symbol index 618. The uplink channel 604 is illustrated in a second resource element index 616 relative to an OFDM symbol index 618. A first slot 620, a second slot 622, a third slot 624, and a fourth slot 626 are illustrated.

The example in FIG. 6 illustrates a cyclical procedure for a channel refresh with a periodicity of two slots (for a pre-equalized transmission) in accordance with some examples of the techniques described herein. As described herein, a downlink reference signal may be allocated on a latter portion of a downlink slot (e.g., on a symbol towards the end of downlink slot). In the example of FIG. 6, a downlink reference signal 606 is allocated on a penultimate symbol of the first slot 620. Other symbols of the first slot 620 on the downlink channel may be occupied with pre-equalized PDSCH data that is pre-equalized based on a previous channel refresh.

A reference signal processing period 608 may begin with, overlap with, or begin after the transmission of the downlink reference signal 606. For example, the reference signal processing period 608 may be a period to allow the wireless device to perform reference signal sampling, quantizing, compression, packing, or a combination thereof, for an uplink transmission.

In some approaches, the raw reference signal sample transmission in the uplink may occupy 1 or 2 uplink symbols on the next uplink slot within a threshold time interval from the downlink reference signal transmission. In the example of FIG. 6, raw reference signal samples 610 are transmitted in the uplink channel with a 1-symbol or 2-symbol time period relative to downlink reference signal transmission in the example of FIG. 6. For example, the wireless device transmits a PUSCH with raw reference signal samples 610 in the second slot 622. In the example of FIG. 6, the raw reference signal samples 610 are transmitted in the first two symbols of the second slot 622 on the uplink channel 604.

A sample processing period 612 may begin with, overlap with, or begin after the transmission of the raw reference signal samples 610. For example, the sample processing period 612 may be a period to allow the UE to perform uplink slot decoding channel estimation based on the raw reference signal samples, pre-equalization calculation and evaluation, or a combination thereof, for a downlink transmission. For example, the UE may consume time (e.g., several symbols) to process the indicated raw reference signal samples on the UE side to perform pre-equalization calculations to be applied on the next downlink slot (e.g., the third slot 624). FIG. 6 illustrates pre-equalized PDSCH transmissions in the third slot 624 and the fourth slot 626 based on the pre-equalization determined in the second slot 622.

In some examples, a channel refresh (e.g., CSI refresh, downlink reference signal allocation and reference signal sample signaling in the uplink) may be performed once per a quantity of slots (e.g., 2 slots, 3, slots, 4, slots) based on channel and synchronization loop stability, and based on operational SNR (which may indicate a sensitivity to channel aging).

In some examples, reference signal sample transmission may be addressed as SCI part 2 (e.g., similar to cellular vehicle-to-everything CV2X), while a lower modulation and coding scheme (MCS) may be utilized for a portion of PUSCH data relative to other PUSCH data.

Figure 7:
FIG. 7 shows an example of a process flow that supports channel estimation reference signals for pre-equalization in accordance with one or more aspects of the present disclosure.

FIG. 7 shows an example of a process flow 700 that supports channel estimation reference signals for pre-equalization in accordance with one or more aspects of the present disclosure. The process flow 700 may include a UE 115-*d*, which may be an example of UEs 115, as described herein. The process flow 700 may also include a network entity 105-*b*, which may be examples of the network entities 105, as described herein. The process flow 700 may also include a wireless device 260-*c*, which may be an example of a wireless device 260 as described herein.

In the following description of the process flow 700, the operations between the network entity 105-*b*, the UE 115-*d*, and the wireless device 260-*c* may be transmitted in a different order than the example order shown, or the operations performed by the network entity 105-*b*, the UE 115-*d*, and the wireless device 260-*c* may be performed in different orders or at different times. Some operations may also be omitted from the process flow 700, and other operations may be added to the process flow 700. Further, although some operations or signaling may be shown to occur at different times for discussion purposes, these operations may actually occur at the same time or in overlapping time periods.

At 710, the UE 115-*d* may transmit a quantization configuration message to the wireless device 260-*c*. For example, the UE 115-*d* may transmit a quantization configuration message as described with reference to FIG. 2 or FIG. 4.

At 715, the UE 115-*d* may transmit one or more downlink reference signals to the wireless device 260-*c*. For example, the UE 115-*d* may transmit the one or more downlink reference signals as described with reference to one or more of FIGS. 2-6. The wireless device 260-*c* may sample the one or more reference signals to obtain raw reference signal samples.

At 720, the wireless device 260-*c* may quantize the reference signal samples. For example, the wireless device 260-*c* may quantize the reference signal samples as described with reference to one or more of FIGS. 2-4 and 6.

At 725, the wireless device 260-*c* may transmit a sample message indicating the raw reference signal samples of the one or more downlink reference signals. For example, the wireless device 260-*c* may transmit the raw reference signal samples as described with reference to one or more of FIGS. 2-4 and 6.

At 730, the UE 115-*d* may dequantize the raw reference signal samples. For example, the UE 115-*d* may dequantize the raw reference signal samples as described with reference to one or more of FIGS. 2-4 and 6.

At 735, the UE 115-*d* may receive data from the network entity. For example, the UE 115-*d* may receive data (e.g., voice, video, text, vehicle control data, gaming data, among other examples) from the network entity as described with reference to one or more of FIGS. 1-2.

At 740, the UE 115-*d* may transmit a pre-equalized data signal to the wireless device 260-*c*. For example, the UE 115-*d* may pre-equalize the data received from the network entity 105-*b* and may transmit the pre-equalized data signal to the wireless device 260-*c*. In some examples, the UE

115-*d* may transmit the pre-equalized data signal as described with reference to one or more of FIGS. 2-4 and 6.

Some examples of the techniques described herein may provide modified channel estimation reference signals (e.g., a mixture CSI-RS and DMRS aspects) for a system with transmit pre-equalization. Some examples of the techniques described herein may provide receive-side information (e.g., reference signal samples) on the transmit side of the link for transmit pre-equalization based on channel estimation downlink reference signal sample reporting or indication in an uplink transmission. Shifting channel estimation to the transmit side may reduce complexity and power consumption on the receive side.

Some examples of the techniques described herein may provide indication of reference signal samples via SCI part 2 in an uplink transmission. Some examples of the technique described herein may provide reduced complexity quantization and compression of reference signal samples for uplink overhead reduction.

Some examples of the techniques described herein may support complexity offloading from the wireless device (including modem complexity). For instance, complexity offloading may enhance the ability of the wireless device 260-*c* (e.g., an XR device) to operate more similarly to an I/O device. Some examples of the techniques described herein may provide modem power consumption reduction at an XR device (e.g., on a receive side of the modem or link) due to "shifting" channel estimation and equalization related complexity and functionality from the XR device to the UE 115-*d* (e.g., transmit side of the link). Some examples of the techniques described herein may provide simplified receive side (e.g., XR) modem hardware. Some examples of the techniques described herein may provide reduced device (e.g., XR) battery size or lower device weight.

Figure 8:
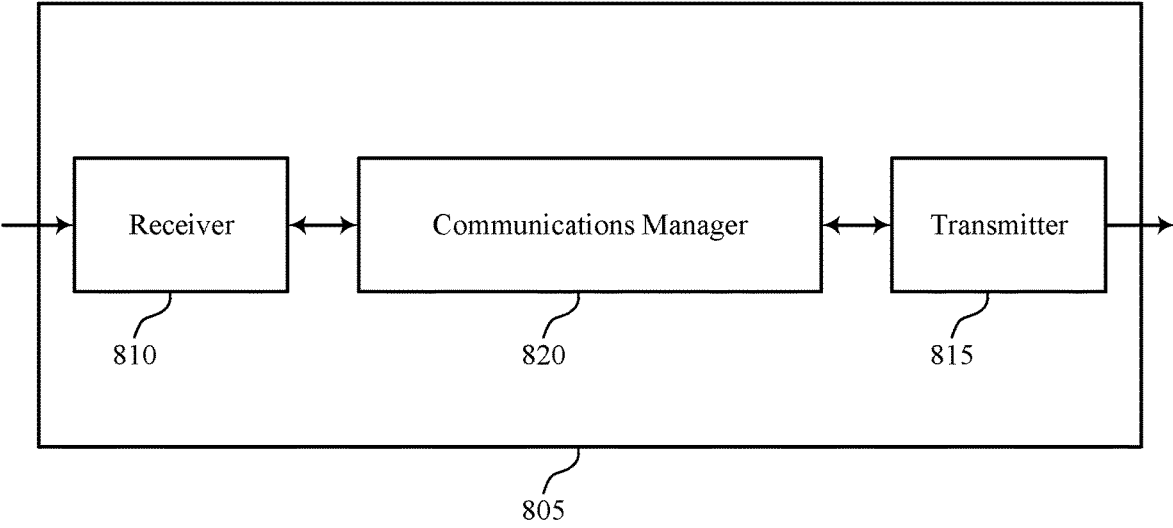
FIGS. 8 and 9 show block diagrams of devices that support channel estimation reference signals for pre-equalization in accordance with one or more aspects of the present disclosure.

FIG. 8 shows a block diagram 800 of a device 805 that supports channel estimation reference signals for pre-equalization in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to channel estimation reference signals for pre-equalization). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to channel estimation reference signals for pre-equalization). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of channel estimation reference signals for pre-equalization as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 is capable of, configured to, or operable to support a means for transmitting one or more downlink reference signals to a wireless device via a sidelink communication link. The communications manager 820 is capable of, configured to, or operable to support a means for receiving, from the wireless device via the sidelink communication link, a sample message indicating raw reference signal samples of the one or more downlink reference signals. The communications manager 820 is capable of, configured to, or operable to support a means for transmitting a data signal to the wireless device, where the data signal is pre-equalized using a downlink channel estimation that is based on a reconstruction of the raw reference signal samples.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for offloading a processor workload.

Figure 9:
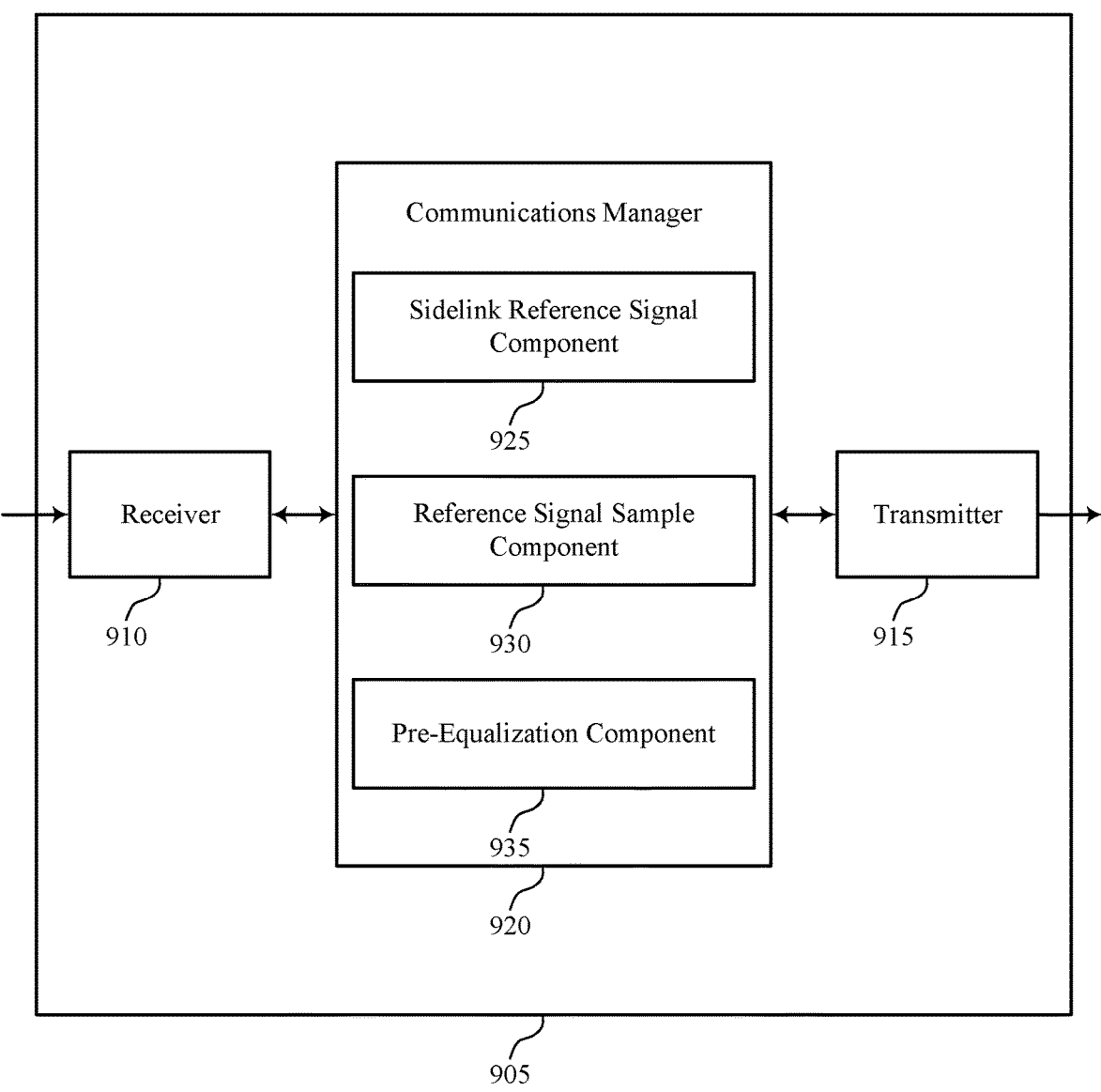

FIG. 9 shows a block diagram 900 of a device 905 that supports channel estimation reference signals for pre-equalization in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to channel estimation reference signals for pre-equalization). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to channel estimation reference signals for pre-equalization). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of channel estimation reference signals for pre-equalization as described herein. For example, the communications manager 920 may include a sidelink reference signal component 925, a reference signal sample component 930, a pre-equalization component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The sidelink reference signal component 925 is capable of, configured to, or operable to support a means for transmitting one or more downlink reference signals to a wireless device via a sidelink communication link. The reference signal sample component 930 is capable of, configured to, or operable to support a means for receiving, from the wireless device via the sidelink communication link, a sample message indicating raw reference signal samples of the one or more downlink reference signals. The pre-equalization component 935 is capable of, configured to, or operable to support a means for transmitting a data signal to the wireless device, where the data signal is pre-equalized using a downlink channel estimation that is based on a reconstruction of the raw reference signal samples.

Figure 10:
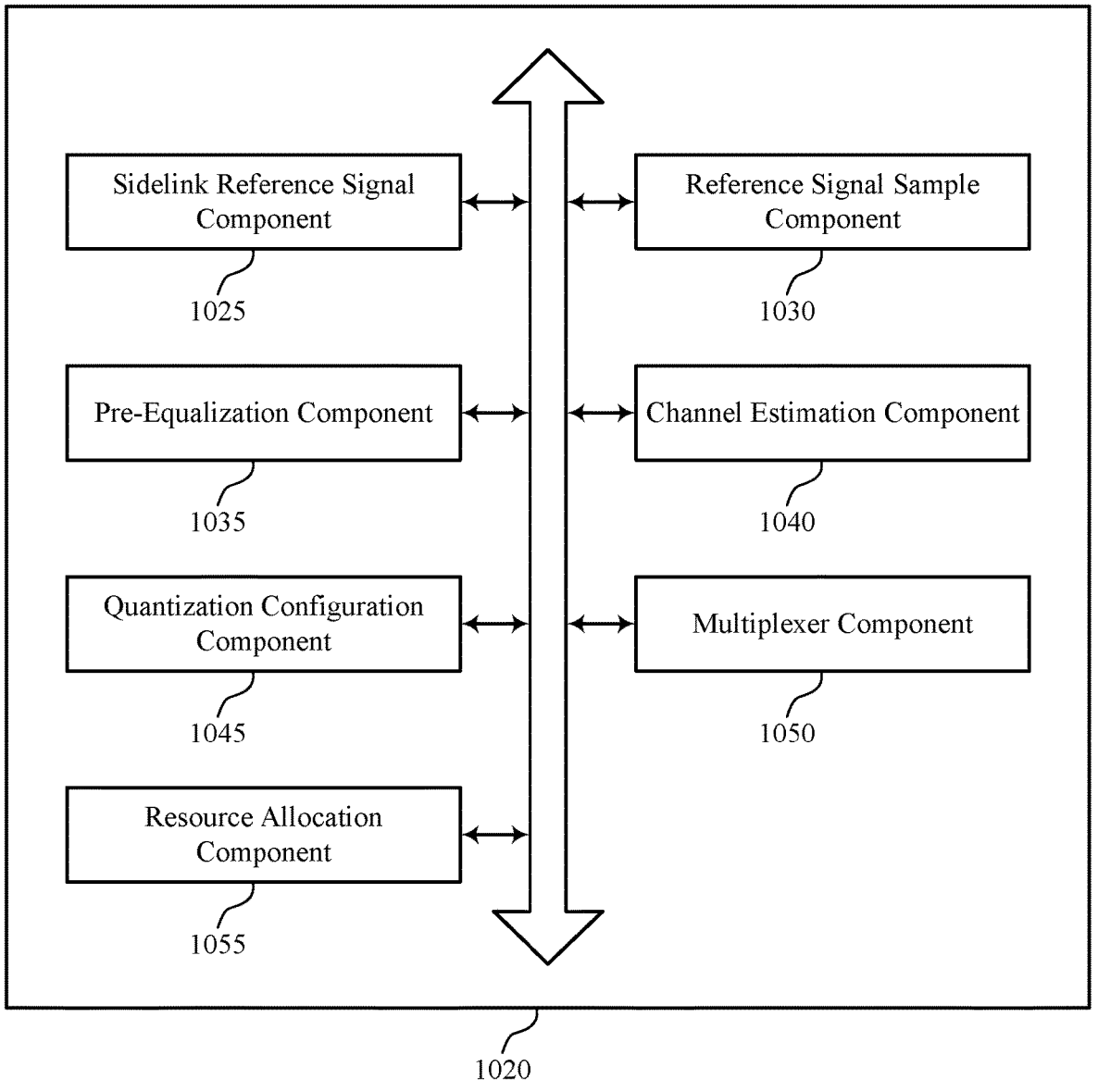
FIG. 10 shows a block diagram of a communications manager that supports channel estimation reference signals for pre-equalization in accordance with one or more aspects of the present disclosure.

FIG. 10 shows a block diagram 1000 of a communications manager 1020 that supports channel estimation reference signals for pre-equalization in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of channel estimation reference signals for pre-equalization as described herein. For example, the communications manager 1020 may include a sidelink reference signal component 1025, a reference signal sample component 1030, a pre-equalization component 1035, a channel estimation component 1040, a quantization configuration component 1045, a multiplexer component 1050, a resource allocation component 1055, or any combination thereof. Each of these components, or components or subcomponents thereof (e.g., one or more processors, one or more memories), may communicate, directly or indirectly, with one another (e.g., via one or more buses).

The sidelink reference signal component 1025 is capable of, configured to, or operable to support a means for transmitting one or more downlink reference signals to a wireless device via a sidelink communication link. The reference signal sample component 1030 is capable of, configured to, or operable to support a means for receiving, from the wireless device via the sidelink communication link, a sample message indicating raw reference signal samples of the one or more downlink reference signals. The pre-equalization component 1035 is capable of, configured to, or operable to support a means for transmitting a data signal to the wireless device, where the data signal is pre-equalized using a downlink channel estimation that is based on a reconstruction of the raw reference signal samples.

In some examples, the channel estimation component 1040 is capable of, configured to, or operable to support a means for generating the downlink channel estimation from the reconstruction of the raw reference signal samples. In some examples, the pre-equalization component 1035 is capable of, configured to, or operable to support a means for performing pre-equalization on the data signal using the downlink channel estimation generated from the reconstruction of the raw reference signal samples. In some examples, the raw reference signal samples include quantized raw reference signal samples. In some examples, the downlink channel estimation is generated based on the reconstruction of the quantized raw reference signal samples.

In some examples, the quantized raw reference signal samples are quantized in accordance with one or more quantization schemes. In some examples, the one or more quantization schemes include differential quantization, differential pulse coding modulation, Lloyd-Max quantization, time domain sample quantization, frequency domain sample quantization, or a combination thereof.

In some examples, the quantization configuration component 1045 is capable of, configured to, or operable to support a means for transmitting, to the wireless device, a quantization configuration message indicating one or more quantization schemes to be applied to the raw reference signal samples, where the raw reference signal samples indicated by the sample message are quantized in accordance with the one or more quantization schemes.

In some examples, the pre-equalization component 1035 is capable of, configured to, or operable to support a means for transmitting a second pre-equalized data signal via a downlink slot, where the one or more downlink reference signals are transmitted via the downlink slot without pre-equalization and without precoding. In some examples, transmitting the second pre-equalized data signal includes transmitting the second pre-equalized data signal via one or more symbols of the downlink slot. In some examples, the one or more downlink reference signals are transmitted via one symbol of the downlink slot.

In some examples, the multiplexer component 1050 is capable of, configured to, or operable to support a means for frequency-division multiplexing ports of the one or more downlink reference signals on resource elements of a resource block to produce frequency-division multiplexed downlink reference signals, where the frequency-division multiplexed downlink reference signals are transmitted on the sidelink communication link via the resource elements of the resource block.

In some examples, to support transmitting the one or more downlink reference signals, the sidelink reference signal component 1025 is capable of, configured to, or operable to support a means for transmitting the one or more downlink reference signals on the sidelink communication link using a set of multiple ports mapped to the resource elements of the resource block with a frequency domain mapping having a density of at least six.

In some examples, to support transmitting the one or more downlink reference signals, the sidelink reference signal component 1025 is capable of, configured to, or operable to support a means for transmitting the one or more downlink reference signals on an orthogonal frequency-division multiplexing symbol without data multiplexing.

In some examples, the resource allocation component 1055 is capable of, configured to, or operable to support a means for transmitting a resource allocation message to the wireless device, the resource allocation message indicating an allocation of a set of downlink resources for the one or more downlink reference signals and an allocation of a set of uplink resources for the sample message indicating the raw reference signal samples, where the one or more downlink reference signals are transmitted via the set of downlink resources and the sample message is received via the set of uplink resources in accordance with the resource allocation message. In some examples, the set of uplink resources for the sample message is within a threshold time interval after the set of downlink resources for the one or more downlink reference signals.

In some examples, the pre-equalization component 1035 is capable of, configured to, or operable to support a means for transmitting a second pre-equalized data signal via a first downlink slot, where the one or more downlink reference signals are transmitted via a latter portion of the first downlink slot, and where the raw reference signal samples are received via an uplink slot following the first downlink slot.

In some examples, the data signal is transmitted via a second downlink slot after the uplink slot. In some examples, the wireless device is an XR device and the data signal is indicative of video data. In some examples, the one or more downlink reference signals include one or more demodulation reference signals or one or more channel state information reference signals.

Figure 11:
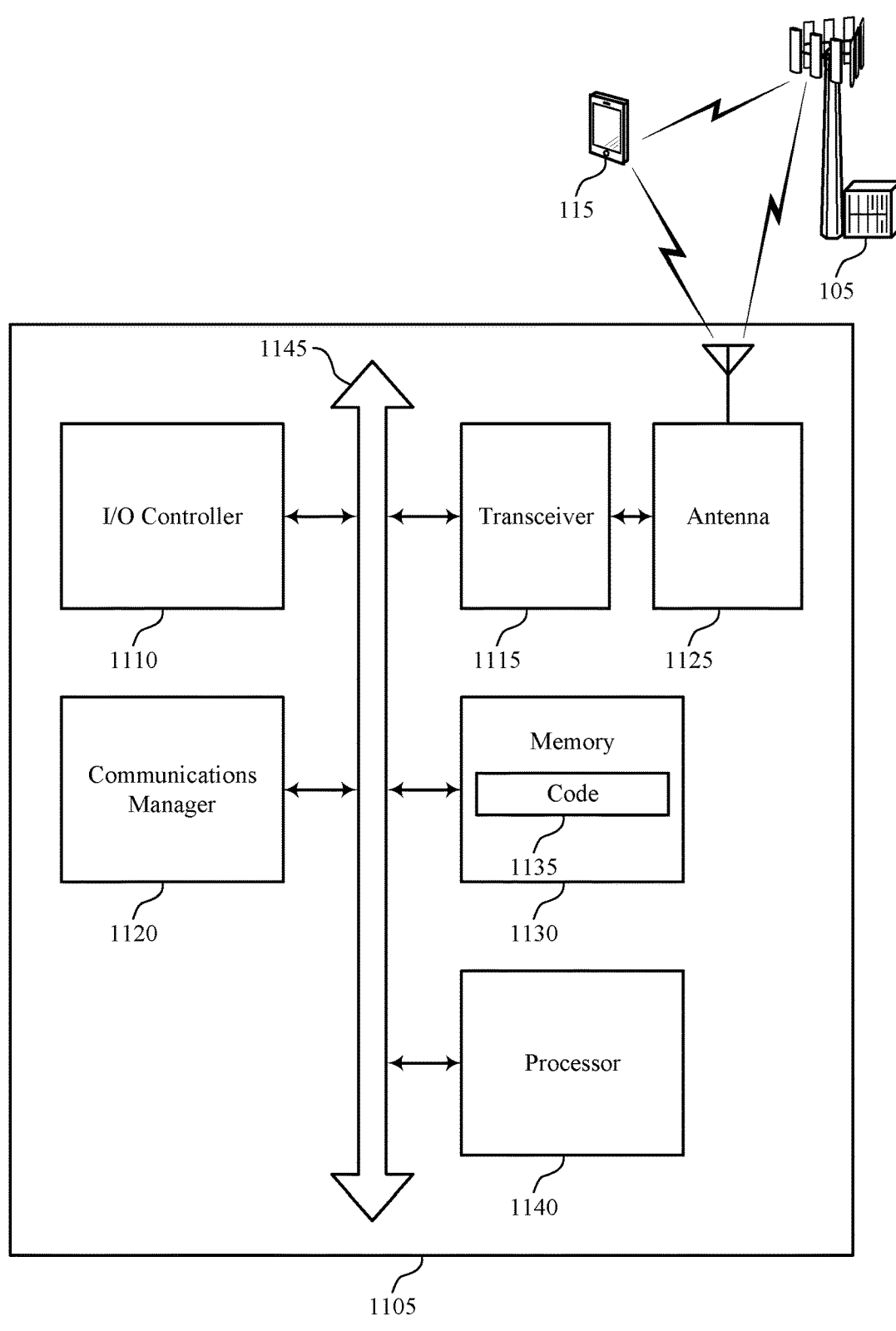
FIG. 11 shows a diagram of a system including a device that supports channel estimation reference signals for pre-equalization in accordance with one or more aspects of the present disclosure.

FIG. 11 shows a diagram of a system 1100 including a device 1105 that supports channel estimation reference signals for pre-equalization in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an I/O controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting channel estimation reference signals for pre-equalization). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein.

For example, the communications manager 1120 is capable of, configured to, or operable to support a means for transmitting one or more downlink reference signals to a wireless device via a sidelink communication link. The communications manager 1120 is capable of, configured to, or operable to support a means for receiving, from the wireless device via the sidelink communication link, a sample message indicating raw reference signal samples of the one or more downlink reference signals. The communications manager 1120 is capable of, configured to, or operable to support a means for transmitting a data signal to the wireless device, where the data signal is pre-equalized using a downlink channel estimation that is based on a reconstruction of the raw reference signal samples.

By including or configuring the communications manager 1120 in accordance with examples as described herein, the device 1105 may support techniques for more efficient utilization of communication resources, improved coordination between devices, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of channel estimation reference signals for pre-equalization as described herein, or the at least one processor 1140 and the at least one memory 1130 may be otherwise configured to, individually or collectively, perform or support such operations.

Figure 12:
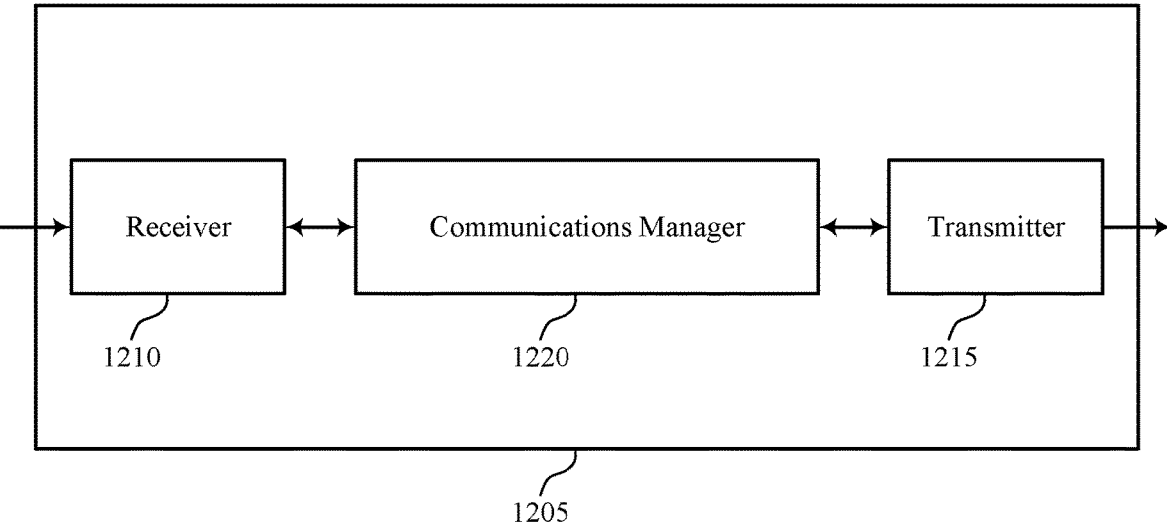
FIGS. 12 and 13 show block diagrams of devices that support channel estimation reference signals for pre-equalization in accordance with one or more aspects of the present disclosure.

FIG. 12 shows a block diagram 1200 of a device 1205 that supports channel estimation reference signals for pre-equalization in accordance with one or more aspects of the present disclosure. The device 1205 may be an example of aspects of a wireless device (e.g., an XR headset, a vehicle, a drone, a UE, a laptop computer, among other examples) as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to, individually or collectively, support or enable the described techniques. Each of these components may be in communication with one another (e.g., via one or more buses).

The receiver 1210 may provide a means for receiving information such as packets, user data, control information, or any combination thereof associated with various information channels (e.g., control channels, data channels, information channels related to channel estimation reference signals for pre-equalization). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to channel estimation reference signals for pre-equalization). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of channel estimation reference signals for pre-equalization as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. For example, the communications manager 1220 is capable of, configured to, or operable to support a means for receiving, from a UE, one or more downlink reference signals via a sidelink communication link. The communications manager 1220 is capable of, configured to, or operable to support a means for transmitting, to the UE via the sidelink communication link, a sample message indicating raw reference signal samples of the one or more downlink reference signals. The communications manager 1220 is capable of, configured to, or operable to support a means for receiving a data signal from the UE, where the data signal is pre-equalized in accordance with a downlink channel estimation that is based on a reconstruction of the raw reference signal samples.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for reduced processing, reduced power consumption, and more efficient utilization of communication resources.

Figure 13:
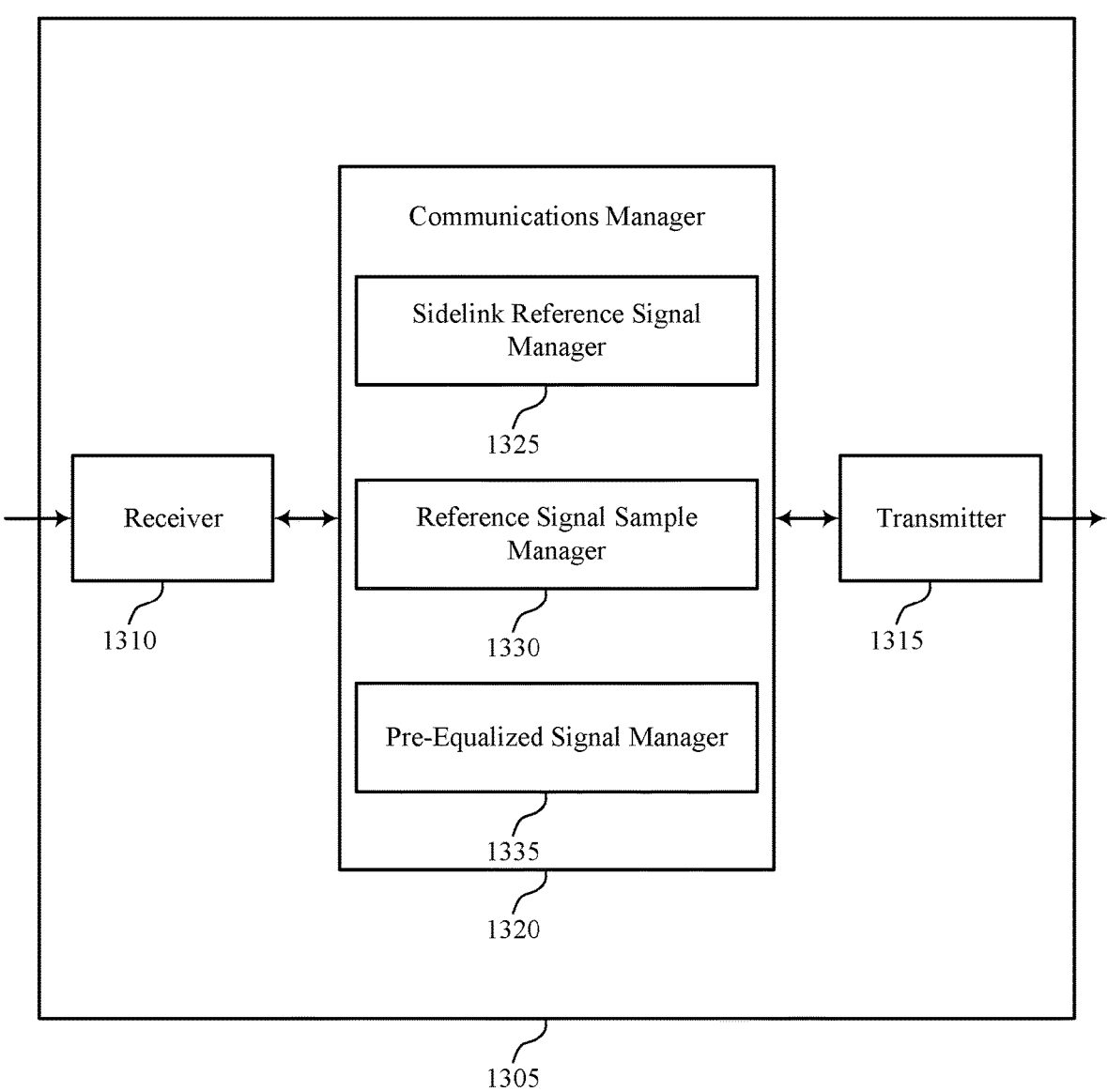

FIG. 13 shows a block diagram 1300 of a device 1305 that supports channel estimation reference signals for pre-equalization in accordance with one or more aspects of the present disclosure. The device 1305 may be an example of aspects of a device 1205 or a wireless device 260 (e.g., an XR device, a peripheral device, or the like) as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for receiving information such as packets, user data, control information, or any combination thereof associated with various information channels (e.g., control channels, data channels, information channels related to channel estimation reference signals for pre-equalization). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to channel estimation reference signals for pre-equalization). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of channel estimation reference signals for pre-equalization as described herein. For example, the communications manager 1320 may include a sidelink reference signal manager 1325, a reference signal sample manager 1330, a pre-equalized signal manager 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. The sidelink reference signal manager 1325 is capable of, configured to, or operable to support a means for receiving, from a UE, one or more downlink reference signals via a sidelink communication link. The reference signal sample manager 1330 is capable of, configured to, or operable to support a means for transmitting, to the UE via the sidelink communication link, a sample message indicating raw reference signal samples of the one or more downlink reference signals. The pre-equalized signal manager 1335 is capable of, configured to, or operable to support a means for receiving a data signal from the UE, where the data signal is pre-equalized in accordance with a downlink channel estimation that is based on a reconstruction of the raw reference signal samples.

Figure 14:
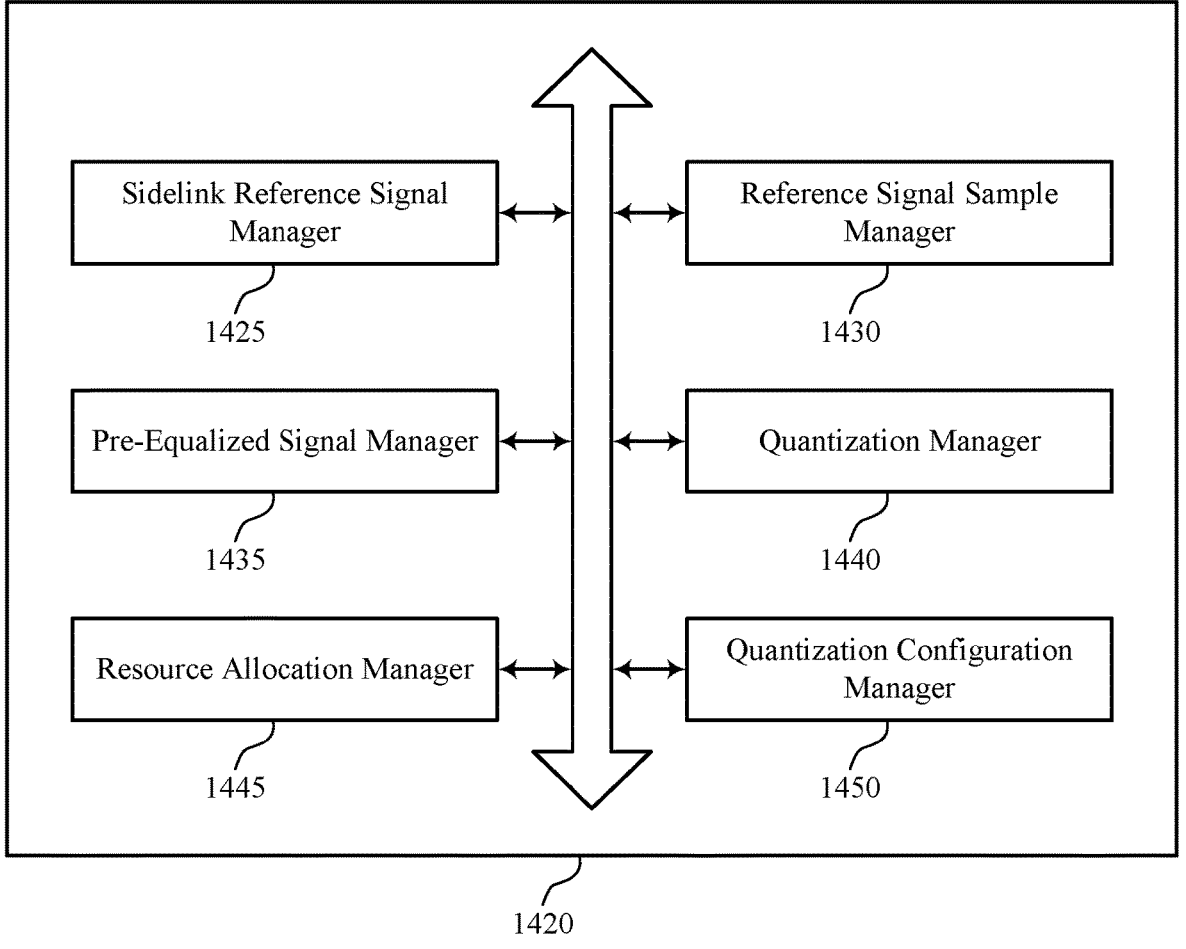
FIG. 14 shows a block diagram of a communications manager that supports channel estimation reference signals for pre-equalization in accordance with one or more aspects of the present disclosure.

FIG. 14 shows a block diagram 1400 of a communications manager 1420 that supports channel estimation reference signals for pre-equalization in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of channel estimation reference signals for pre-equalization as described herein. For example, the communications manager 1420 may include a sidelink reference signal manager 1425, a reference signal sample manager 1430, a pre-equalized signal manager 1435, a quantization manager 1440, a resource allocation manager 1445, a quantization configuration manager 1450, or any combination thereof. Each of these components, or components or subcomponents thereof (e.g., one or more processors, one or more memories), may communicate, directly or indirectly, with one another (e.g., via one or more buses).

The communications manager 1420 may support wireless communications in accordance with examples as disclosed herein. The sidelink reference signal manager 1425 is capable of, configured to, or operable to support a means for receiving, from a UE, one or more downlink reference signals via a sidelink communication link. The reference signal sample manager 1430 is capable of, configured to, or operable to support a means for transmitting, to the UE via the sidelink communication link, a sample message indicat-ing raw reference signal samples of the one or more downlink reference signals. The pre-equalized signal manager 1435 is capable of, configured to, or operable to support a means for receiving a data signal from the UE, where the data signal is pre-equalized in accordance with a downlink channel estimation that is based on a reconstruction of the raw reference signal samples.

In some examples, the quantization manager 1440 is capable of, configured to, or operable to support a means for quantizing the raw reference signal samples in accordance with one or more quantization schemes, where the sample message includes the quantized raw reference signal samples. In some examples, the one or more quantization schemes include differential quantization, differential pulse coding modulation, Lloyd-Max quantization, time domain sample quantization, frequency domain sample quantization, or a combination thereof.

In some examples, the quantization configuration manager 1450 is capable of, configured to, or operable to support a means for receiving, from the UE, a quantization configuration message indicating the one or more quantization schemes to be applied to the raw reference signal samples, where the raw reference signal samples are quantized in accordance with the one or more quantization schemes.

In some examples, the pre-equalized signal manager 1435 is capable of, configured to, or operable to support a means for receiving a second pre-equalized data signal via a downlink slot, where the one or more downlink reference signals are received via the downlink slot without pre-equalization and without precoding. In some examples, receiving the one or more downlink reference signals includes receiving frequency-division multiplexed downlink reference signals on the sidelink communication link via resource elements of a resource block.

In some examples, to support receiving the one or more downlink reference signals, the sidelink reference signal manager 1425 is capable of, configured to, or operable to support a means for receiving the one or more downlink reference signals on the sidelink communication link based on a set of multiple ports mapped to the resource elements of the resource block with a frequency domain mapping having a density of at least six.

In some examples, to support receiving the one or more downlink reference signals, the sidelink reference signal manager 1425 is capable of, configured to, or operable to support a means for receiving the one or more downlink reference signals on an orthogonal frequency-division mul-tiplexing symbol without data multiplexing. In some examples, receiving the second pre-equalized data signal includes receiving the second pre-equalized data signal via one or more symbols of the downlink slot. In some examples, the one or more downlink reference signals are received via one symbol of the downlink slot.

In some examples, the resource allocation manager 1445 is capable of, configured to, or operable to support a means for receiving a resource allocation message from the UE, the resource allocation message indicating an allocation of a set of downlink resources for the one or more downlink reference signals and an allocation of a set of uplink resources for the sample message indicating the raw reference signal samples, where the one or more downlink reference signals are received via the set of downlink resources and the sample message is transmitted via the set of uplink resources in accordance with the resource allocation message. In some examples, the set of uplink resources for the sample message is within a threshold time interval after the set of downlink resources for the one or more downlink reference signals.

In some examples, the pre-equalized signal manager 1435 is capable of, configured to, or operable to support a means for receiving a second pre-equalized data signal via a first downlink slot, where the one or more downlink reference signals are received via a latter portion of the first downlink slot, and where the raw reference signal samples are transmitted via an uplink slot following the first downlink slot.

In some examples, the data signal is received via a second downlink slot after the uplink slot. In some examples, the wireless device is an XR device and the data signal is indicative of video data. In some examples, the one or more downlink reference signals include one or more demodulation reference signals or one or more channel state information reference signals.

Figure 15:
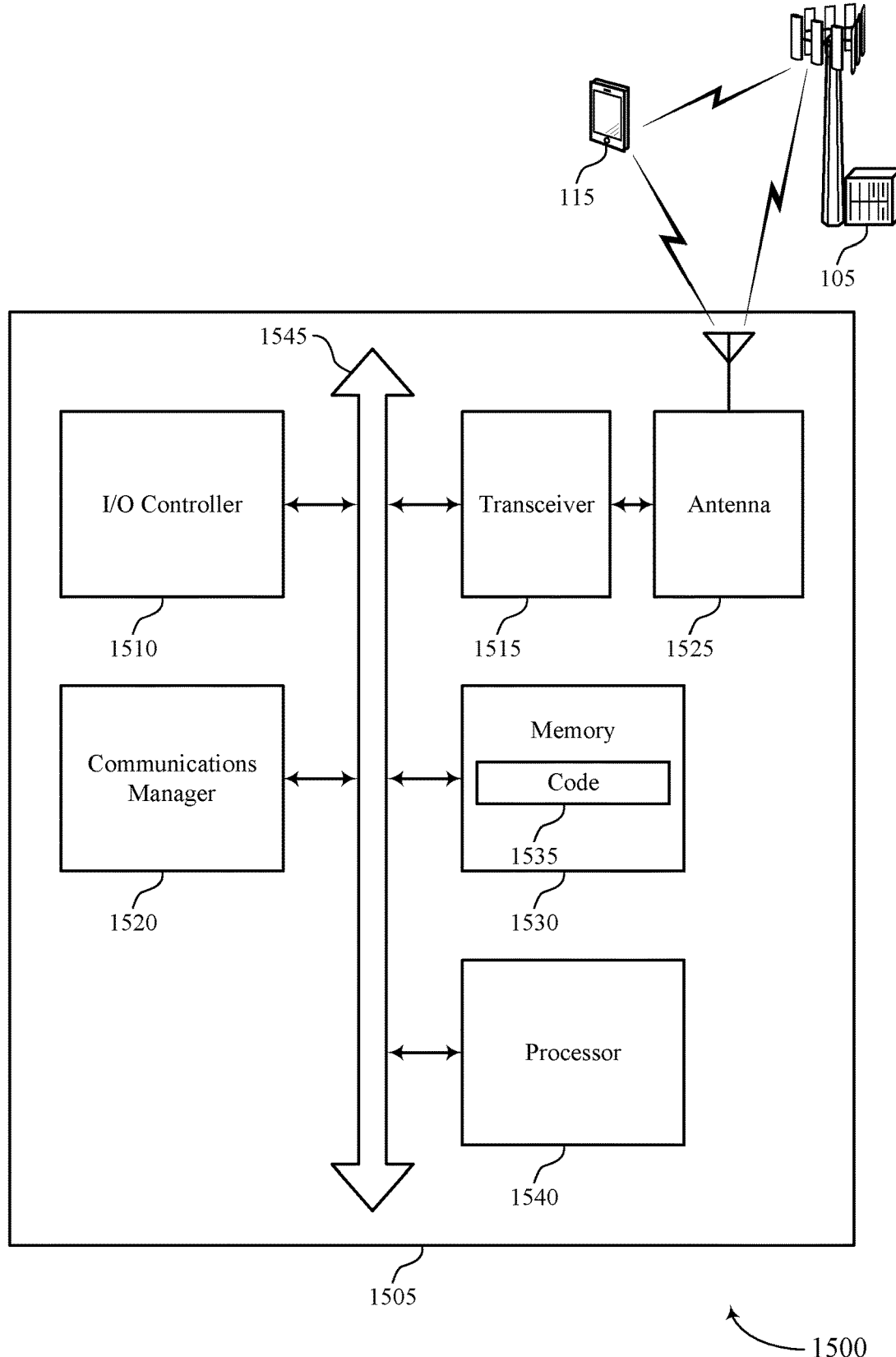
FIG. 15 shows a diagram of a system including a device that supports channel estimation reference signals for pre-equalization in accordance with one or more aspects of the present disclosure.

FIG. 15 shows a diagram of a system 1500 including a device 1505 that supports channel estimation reference signals for pre-equalization in accordance with one or more aspects of the present disclosure. The device 1505 may be an example of or include the components of a device 1205, a device 1305, or a wireless device as described herein. The device 1505 may include components for bi-directional voice and data communications including components for transmitting and receiving communications, such as a communications manager 1520, an I/O controller 1510, a transceiver 1515, an antenna 1525, at least one memory 1530, code 1535, and at least one processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of one or more processors, such as the at least one processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The at least one memory 1530 may include RAM and ROM. The at least one memory 1530 may store computer-readable, computer-executable code 1535 including instructions that, when executed by the at least one processor 1540, cause the device 1505 to perform various functions described herein. The code 1535 may be stored in a non-transitory computer-readable medium such as system memory or another type of memory. In some cases, the code 1535 may not be directly executable by the at least one processor 1540 but may cause a computer (e.g., when compiled and executed) to perform functions described herein. In some cases, the at least one memory 1530 may contain, among other things, a BIOS which may control basic hardware or software operation such as the interaction with peripheral components or devices.

The at least one processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1540 may be configured to operate a memory array using a memory controller. In some other cases, a memory controller may be integrated into the at least one processor 1540. The at least one processor 1540 may be configured to execute computer-readable instructions stored in a memory (e.g., the at least one memory 1530) to cause the device 1505 to perform various functions (e.g., functions or tasks supporting channel estimation reference signals for pre-equalization). For example, the device 1505 or a component of the device 1505 may include at least one processor 1540 and at least one memory 1530 coupled with or to the at least one processor 1540, the at least one processor 1540 and at least one memory 1530 configured to perform various functions described herein. In some examples, the at least one processor 1540 may include multiple processors and the at least one memory 1530 may include multiple memories. One or more of the multiple processors may be coupled with one or more of the multiple memories, which may, individually or collectively, be configured to perform various functions herein. In some examples, the at least one processor 1540 may be a component of a processing system, which may refer to a system (such as a series) of machines, circuitry (including, for example, one or both of processor circuitry (which may include the at least one processor 1540) and memory circuitry (which may include the at least one memory 1530)), or components, that receives or obtains inputs and processes the inputs to produce, generate, or obtain a set of outputs. The processing system may be configured to perform one or more of the functions described herein. As such, the at least one processor 1540 or a processing system including the at least one processor 1540 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1530 or otherwise, to perform one or more of the functions described herein.

The communications manager 1520 may support wireless communications in accordance with examples as disclosed herein. For example, the communications manager 1520 is capable of, configured to, or operable to support a means for receiving, from a UE, one or more downlink reference signals via a sidelink communication link. The communications manager 1520 is capable of, configured to, or operable to support a means for transmitting, to the UE via the sidelink communication link, a sample message indicating raw reference signal samples of the one or more downlink reference signals. The communications manager 1520 is capable of, configured to, or operable to support a means for receiving a data signal from the UE, where the data signal is pre-equalized in accordance with a downlink channel estimation that is based on a reconstruction of the raw reference signal samples.

By including or configuring the communications manager 1520 in accordance with examples as described herein, the device 1505 may support techniques for reduced power consumption, more efficient utilization of communication resources, improved coordination between devices, longer battery life, and improved utilization of processing capability.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the at least one processor 1540, the at least one memory 1530, the code 1535, or any combination thereof. For example, the code 1535 may include instructions executable by the at least one processor 1540 to cause the device 1505 to perform various aspects of channel estimation reference signals for pre-equalization as described herein, or the at least one processor 1540 and the at least one memory 1530 may be otherwise configured to, individually or collectively, perform or support such operations.

FIG. 16 shows a flowchart illustrating a method 1600 that supports channel estimation reference signals for pre-equalization in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting one or more downlink reference signals to a wireless device via a sidelink communication link. The operations of 1605 may be performed in accordance with examples as disclosed herein. In some examples, aspects of the operations of 1605 may be performed by a sidelink reference signal component 1025 as described with reference to FIG. 10.

At 1610, the method may include receiving, from the wireless device via the sidelink communication link, a sample message indicating raw reference signal samples of the one or more downlink reference signals. The operations of 1610 may be performed in accordance with examples as disclosed herein. In some examples, aspects of the operations of 1610 may be performed by a reference signal sample component 1030 as described with reference to FIG. 10.

At 1615, the method may include transmitting a data signal to the wireless device, where the data signal is pre-equalized using a downlink channel estimation that is based on a reconstruction of the raw reference signal samples. The operations of 1615 may be performed in accordance with examples as disclosed herein. In some examples, aspects of the operations of 1615 may be performed by a pre-equalization component 1035 as described with reference to FIG. 10.

FIG. 17 shows a flowchart illustrating a method 1700 that supports channel estimation reference signals for pre-equalization in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include transmitting one or more downlink reference signals to a wireless device via a sidelink communication link. The operations of 1705 may be performed in accordance with examples as disclosed herein. In some examples, aspects of the operations of 1705 may be performed by a sidelink reference signal component 1025 as described with reference to FIG. 10.

At 1710, the method may include receiving, from the wireless device via the sidelink communication link, a sample message indicating raw reference signal samples of the one or more downlink reference signals. The operations of 1710 may be performed in accordance with examples as disclosed herein. In some examples, aspects of the operations of 1710 may be performed by a reference signal sample component 1030 as described with reference to FIG. 10.

At 1715, the method may include generating the downlink channel estimation from the reconstruction of the raw reference signal samples. The operations of 1715 may be performed in accordance with examples as disclosed herein. In some examples, aspects of the operations of 1715 may be performed by a channel estimation component 1040 as described with reference to FIG. 10.

At 1720, the method may include performing pre-equalization on the data signal using the downlink channel estimation generated from the reconstruction of the raw reference signal samples. The operations of 1720 may be performed in accordance with examples as disclosed herein. In some examples, aspects of the operations of 1720 may be performed by a pre-equalization component 1035 as described with reference to FIG. 10.

At 1725, the method may include transmitting a data signal to the wireless device, where the data signal is pre-equalized using a downlink channel estimation that is based on a reconstruction of the raw reference signal samples. The operations of 1725 may be performed in accordance with examples as disclosed herein. In some examples, aspects of the operations of 1725 may be performed by a pre-equalization component 1035 as described with reference to FIG. 10.

FIG. 18 shows a flowchart illustrating a method 1800 that supports channel estimation reference signals for pre-equalization in accordance with aspects of the present disclosure. The operations of the method 1800 may be implemented by a wireless device or its components as described herein. For example, the operations of the method 1800 may be performed by a wireless device as described with reference to FIGS. 1 through 7 and 12 through 15. In some examples, a wireless device may execute a set of instructions to control the functional elements of the wireless device to perform the described functions. Additionally, or alternatively, the wireless device may perform aspects of the described functions using special-purpose hardware.

At 1805, the method may include receiving, from a UE, one or more downlink reference signals via a sidelink communication link. The operations of 1805 may be performed in accordance with examples as disclosed herein. In some examples, aspects of the operations of 1805 may be performed by a sidelink reference signal manager 1425 as described with reference to FIG. 14.

At 1810, the method may include transmitting, to the UE via the sidelink communication link, a sample message indicating raw reference signal samples of the one or more downlink reference signals. The operations of 1810 may be performed in accordance with examples as disclosed herein. In some examples, aspects of the operations of 1810 may be performed by a reference signal sample manager 1430 as described with reference to FIG. 14.

At 1815, the method may include receiving a data signal from the UE, where the data signal is pre-equalized in accordance with a downlink channel estimation that is based on a reconstruction of the raw reference signal samples. The operations of 1815 may be performed in accordance with examples as disclosed herein. In some examples, aspects of the operations of 1815 may be performed by a pre-equalized signal manager 1435 as described with reference to FIG. 14.

FIG. 19 shows a flowchart illustrating a method 1900 that supports channel estimation reference signals for pre-equalization in accordance with aspects of the present disclosure. The operations of the method 1900 may be implemented by a wireless device or its components as described herein. For example, the operations of the method 1900 may be performed by a wireless device as described with reference to FIGS. 1 through 7 and 12 through 15. In some examples, a wireless device may execute a set of instructions to control the functional elements of the wireless device to perform the described functions. Additionally, or alternatively, the wireless device may perform aspects of the described functions using special-purpose hardware.

At 1905, the method may include receiving, from a UE, one or more downlink reference signals via a sidelink communication link. The operations of 1905 may be performed in accordance with examples as disclosed herein. In some examples, aspects of the operations of 1905 may be performed by a sidelink reference signal manager 1425 as described with reference to FIG. 14.

At 1910, the method may include quantizing raw reference signal samples of the one or more downlink reference signals in accordance with one or more quantization schemes. The operations of 1910 may be performed in accordance with examples as disclosed herein. In some examples, aspects of the operations of 1910 may be performed by a quantization manager 1440 as described with reference to FIG. 14.

At 1915, the method may include transmitting, to the UE via the sidelink communication link, a sample message indicating the raw reference signal samples of the one or more downlink reference signals. For example, the sample message may include the quantized raw reference signal samples. The operations of 1915 may be performed in accordance with examples as disclosed herein. In some examples, aspects of the operations of 1915 may be performed by a reference signal sample manager 1430 as described with reference to FIG. 14.

At 1920, the method may include receiving a data signal from the UE, where the data signal is pre-equalized in accordance with a downlink channel estimation that is based on a reconstruction of the raw reference signal samples. The operations of 1920 may be performed in accordance with examples as disclosed herein. In some examples, aspects of the operations of 1920 may be performed by a pre-equalized signal manager 1435 as described with reference to FIG. 14.

The following provides an overview of aspects of the present disclosure:

Aspect 1: A method for wireless communications at a UE, comprising: transmitting one or more downlink reference signals to a wireless device via a sidelink communication link: receiving, from the wireless device via the sidelink communication link, a sample message indicating raw reference signal samples of the one or more downlink reference signals; and transmitting a data signal to the wireless device, wherein the data signal is pre-equalized using a downlink channel estimation that is based at least in part on a reconstruction of the raw reference signal samples.

Aspect 2: The method of aspect 1, further comprising: generating the downlink channel estimation from the reconstruction of the raw reference signal samples; and performing pre-equalization on the data signal using the downlink channel estimation generated from the reconstruction of the raw reference signal samples.

Aspect 3: The method of aspect 2, wherein the raw reference signal samples comprise quantized raw reference signal samples, and the downlink channel estimation is generated based at least in part on the reconstruction of the quantized raw reference signal samples.

Aspect 4: The method of aspect 3, wherein the quantized raw reference signal samples are quantized in accordance with one or more quantization schemes, and the one or more quantization schemes comprise differential quantization, differential pulse coding modulation, Lloyd-Max quantization, time domain sample quantization, frequency domain sample quantization, or a combination thereof.

Aspect 5: The method of any of aspects 1 through 4, further comprising: transmitting, to the wireless device, a quantization configuration message indicating one or more quantization schemes to be applied to the raw reference signal samples, wherein the raw reference signal samples indicated by the message are quantized in accordance with the one or more quantization schemes.

Aspect 6: The method of any of aspects 1 through 5, further comprising: transmitting a second pre-equalized data signal via a downlink slot, wherein the one or more downlink reference signals are transmitted via the downlink slot without pre-equalization and without precoding.

Aspect 7: The method of aspect 6, wherein transmitting the second pre-equalized data signal comprises transmitting the second pre-equalized data signal via one or more symbols of the downlink slot, and the one or more downlink reference signals are transmitted via one symbol of the downlink slot.

Aspect 8: The method of any of aspects 1 through 7, further comprising: frequency-division multiplexing ports of the one or more downlink reference signals on resource elements of a resource block to produce frequency-division multiplexed downlink reference signals, wherein the frequency-division multiplexed downlink reference signals are transmitted on the sidelink communication link via the resource elements of the resource block.

Aspect 9: The method of aspect 8, wherein transmitting the one or more downlink reference signals comprises: transmitting the one or more downlink reference signals on the sidelink communication link using a plurality of ports mapped to the resource elements of the resource block with a frequency domain mapping having a density of at least six.

Aspect 10: The method of any of aspects 1 through 9, wherein transmitting the one or more downlink reference signals comprises: transmitting the one or more downlink reference signals on an orthogonal frequency-division multiplexing symbol without data multiplexing.

Aspect 11: The method of any of aspects 1 through 10, further comprising: transmitting a resource allocation message to the wireless device, the resource allocation message indicating an allocation of a set of downlink resources for the one or more downlink reference signals and an allocation of a set of uplink resources for the sample message indicating the raw reference signal samples, wherein the one or more downlink reference signals are transmitted via the set of downlink resources and the sample message is received via the set of uplink resources in accordance with the resource allocation message.

Aspect 12: The method of aspect 11, wherein the set of uplink resources for the sample message is within a threshold time interval after the set of downlink resources for the one or more downlink reference signals.

Aspect 13: The method of any of aspects 1 through 12, further comprising: transmitting a second pre-equalized data signal via a first downlink slot, wherein the one or more downlink reference signals are transmitted via a latter portion of the first downlink slot, and wherein the raw reference signal samples are received via an uplink slot following the first downlink slot.

Aspect 14: The method of aspect 13, wherein the data signal is transmitted via a second downlink slot after the uplink slot.

Aspect 15: The method of any of aspects 1 through 14, wherein the wireless device is an extended reality device and the data signal is indicative of video data.

Aspect 16: The method of any of aspects 1 through 15, wherein the one or more downlink reference signals comprise one or more DMRSs or one or more CSI-RSs.

Aspect 17: A method for wireless communications at a wireless device, comprising: receiving, from a UE, one or more downlink reference signals via a sidelink communication link: transmitting, to the UE via the sidelink communication link, a sample message indicating raw reference signal samples of the one or more downlink reference signals; and receiving a data signal from the UE, wherein the data signal is pre-equalized in accordance with a downlink channel estimation that is based at least in part on a reconstruction of the raw reference signal samples.

Aspect 18: The method of aspect 17, further comprising: quantizing the raw reference signal samples in accordance with one or more quantization schemes, wherein the sample message comprises the quantized raw reference signal samples.

Aspect 19: The method of aspect 18, wherein the one or more quantization schemes comprise differential quantization, differential pulse coding modulation, Lloyd-Max quantization, time domain sample quantization, frequency domain sample quantization, or a combination thereof.

Aspect 20: The method of any of aspects 18 through 19, further comprising: receiving, from the UE, a quantization configuration message indicating the one or more quantization schemes to be applied to the raw reference signal samples, wherein the raw reference signal samples are quantized in accordance with the one or more quantization schemes.

Aspect 21: The method of any of aspects 17 through 20, further comprising: receiving a second pre-equalized data signal via a downlink slot, wherein the one or more downlink reference signals are received via the downlink slot without pre-equalization and without precoding.

Aspect 22: The method of any of aspects 17 through 21, wherein receiving the one or more downlink reference signals comprises receiving frequency-division multiplexed downlink reference signals on the sidelink communication link via resource elements of a resource block.

Aspect 23: The method of aspect 22, wherein receiving the one or more downlink reference signals comprises: receiving the one or more downlink reference signals on the sidelink communication link based at least in part on a plurality of ports mapped to the resource elements of the resource block with a frequency domain mapping having a density of at least six.

Aspect 24: The method of any of aspects 17 through 23, wherein receiving the one or more downlink reference signals comprises: receiving the one or more downlink reference signals on an orthogonal frequency-division multiplexing symbol without data multiplexing.

Aspect 25: The method of aspect 24, wherein receiving the second pre-equalized data signal comprises receiving the second pre-equalized data signal via one or more symbols of the downlink slot, and the one or more downlink reference signals are received via one symbol of the downlink slot.

Aspect 26: The method of any of aspects 17 through 25, further comprising: receiving a resource allocation message from the UE, the resource allocation message indicating an allocation of a set of downlink resources for the one or more downlink reference signals and an allocation of a set of uplink resources for the sample message indicating the raw reference signal samples, wherein the one or more downlink reference signals are received via the set of downlink resources and the sample message is transmitted via the set of uplink resources in accordance with the resource allocation message.

Aspect 27: The method of aspect 26, wherein the set of uplink resources for the sample message is within a threshold time interval after the set of downlink resources for the one or more downlink reference signals.

Aspect 28: The method of any of aspects 17 through 27, further comprising: receiving a second pre-equalized data signal via a first downlink slot, wherein the one or more downlink reference signals are received via a latter portion of the first downlink slot, and wherein the raw reference signal samples are transmitted via an uplink slot following the first downlink slot.

Aspect 29: The method of aspect 28, wherein the data signal is received via a second downlink slot after the uplink slot.

Aspect 30: The method of any of aspects 17 through 29, wherein the wireless device is an extended reality device and the data signal is indicative of video data.

Aspect 31: The method of any of aspects 17 through 30, wherein the one or more downlink reference signals comprise one or more DMRSs or one or more CSI-RSs.

Aspect 32: A UE comprising one or more memories storing processor-executable code, and one or more processors coupled with the one or more memories and individually or collectively operable to execute the code to cause the UE to perform a method of any of aspects 1 through 16.

Aspect 33: A UE comprising at least one means for performing a method of any of aspects 1 through 16.

Aspect 34: A non-transitory computer-readable medium storing code the code comprising instructions executable by one or more processors to perform a method of any of aspects 1 through 16.

Aspect 35: A wireless device for wireless communications, comprising one or more memories storing processor-executable code, and one or more processors coupled with the one or more memories and individually or collectively operable to execute the code to cause the wireless device to perform a method of any of aspects 17 through 31.

Aspect 36: A wireless device for wireless communications, comprising at least one means for performing a method of any of aspects 17 through 31.

Aspect 37: A non-transitory computer-readable medium storing code for wireless communications, the code comprising instructions executable by one or more processors to perform a method of any of aspects 17 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more memories storing processor-executable code; and one or more processors coupled with the one or more memories and individually or collectively operable to execute the code to cause the UE to:

transmit, to a wireless device, a resource allocation message indicating an allocation of a set of downlink resources for one or more downlink reference signals and an allocation of a set of uplink resources for a sample message;

transmit the one or more downlink reference signals to the wireless device via a sidelink communication link and the set of downlink resources in accordance with the resource allocation message;

receive, from the wireless device via the sidelink communication link and the set of uplink resources in accordance with the resource allocation message, the sample message indicating raw reference signal samples of the one or more downlink reference signals; and transmit a data signal to the wireless device, wherein the data signal is pre-equalized using a downlink channel estimation that is based at least in part on a reconstruction of the raw reference signal samples.

2. The UE of claim 1, wherein the one or more processors are individually or collectively further operable to execute the code to cause the UE to:

generate the downlink channel estimation from the reconstruction of the raw reference signal samples; and perform pre-equalization on the data signal using the downlink channel estimation generated from the reconstruction of the raw reference signal samples.

3. The UE of claim 2, wherein:

the raw reference signal samples comprise quantized raw reference signal samples, and the downlink channel estimation is generated based at least in part on the reconstruction of the quantized raw reference signal samples.

4. The UE of claim 3, wherein:

the quantized raw reference signal samples are quantized in accordance with one or more quantization schemes, and the one or more quantization schemes comprise differential quantization, differential pulse coding modulation, Lloyd-Max quantization, time domain sample quantization, frequency domain sample quantization, or a combination thereof.

5. The UE of claim 1, wherein the one or more processors are individually or collectively further operable to execute the code to cause the UE to:

transmit, to the wireless device, a quantization configuration message indicating one or more quantization schemes to be applied to the raw reference signal samples, wherein the raw reference signal samples indicated by the sample message are quantized in accordance with the one or more quantization schemes.

6. The UE of claim 1, wherein the one or more processors are individually or collectively further operable to execute the code to cause the UE to:

transmit a second pre-equalized data signal via a downlink slot, wherein the one or more downlink reference signals are transmitted via the downlink slot without pre-equalization and without precoding.

7. The UE of claim 6, wherein:

transmitting the second pre-equalized data signal comprises transmitting the second pre-equalized data signal via one or more symbols of the downlink slot, and the one or more downlink reference signals are transmitted via one symbol of the downlink slot.

8. The UE of claim 1, wherein the one or more processors are individually or collectively further operable to execute the code to cause the UE to:

frequency-division multiplex ports of the one or more downlink reference signals on resource elements of a resource block to produce frequency-division multiplexed downlink reference signals, wherein the frequency-division multiplexed downlink reference signals are transmitted on the sidelink communication link via the resource elements of the resource block.

9. The UE of claim 8, wherein, to transmit the one or more downlink reference signals, the one or more processors are individually or collectively operable to execute the code to cause the UE to:

transmit the one or more downlink reference signals on the sidelink communication link using a plurality of ports mapped to the resource elements of the resource block with a frequency domain mapping having a density of at least six.

10. The UE of claim 1, wherein, to transmit the one or more downlink reference signals, the one or more processors are individually or collectively operable to execute the code to cause the UE to:

transmit the one or more downlink reference signals on an orthogonal frequency-division multiplexing symbol without data multiplexing.

11. The UE of claim 1, wherein the set of uplink resources for the sample message is within a threshold time interval after the set of downlink resources for the one or more downlink reference signals.

12. The UE of claim 1, wherein the one or more processors are individually or collectively further operable to execute the code to cause the UE to:

transmit a second pre-equalized data signal via a first downlink slot, wherein the one or more downlink reference signals are transmitted via a latter portion of the first downlink slot, the raw reference signal samples are received via an uplink slot following the first downlink slot, and the data signal is transmitted via a second downlink slot after the uplink slot.

13. The UE of claim 1, wherein:

the one or more downlink reference signals comprise one or more demodulation reference signals or one or more channel state information reference signals.

14. A wireless device for wireless communication, comprising:

one or more memories storing processor-executable code; and one or more processors coupled with the one or more memories and individually or collectively operable to execute the code to cause the wireless device to:

receive, from a user equipment (UE), a resource allocation message indicating an allocation of a set of downlink resources for one or more downlink reference signals and an allocation of a set of uplink resources for a sample message;

receive, from the UE, the one or more downlink reference signals via a sidelink communication link and the set of downlink resources in accordance with the resource allocation message;

transmit, to the UE via the sidelink communication link and the set of uplink resources in accordance with the resource allocation message, the sample message indicating raw reference signal samples of the one or more downlink reference signals; and receive a data signal from the UE, wherein the data signal is pre-equalized in accordance with a downlink channel estimation that is based at least in part on a reconstruction of the raw reference signal samples.

15. The wireless device of claim 14, wherein the one or more processors are individually or collectively further operable to execute the code to cause the wireless device to:

quantize the raw reference signal samples in accordance with one or more quantization schemes, wherein the sample message comprises the quantized raw reference signal samples.

16. The wireless device of claim 15, wherein the one or more quantization schemes comprise differential quantization, differential pulse coding modulation, Lloyd-Max quantization, time domain sample quantization, frequency domain sample quantization, or a combination thereof.

17. The wireless device of claim 15, wherein the one or more processors are individually or collectively further operable to execute the code to cause the wireless device to:

receive, from the UE, a quantization configuration message indicating the one or more quantization schemes to be applied to the raw reference signal samples, wherein the raw reference signal samples are quantized in accordance with the one or more quantization schemes.

18. The wireless device of claim 14, wherein the one or more processors are individually or collectively further operable to execute the code to cause the wireless device to:

receive a second pre-equalized data signal via a downlink slot, wherein the one or more downlink reference signals are received via the downlink slot without pre-equalization and without precoding.

19. The wireless device of claim 18, wherein:

receiving the second pre-equalized data signal comprises receiving the second pre-equalized data signal via one or more symbols of the downlink slot, and the one or more downlink reference signals are received via one symbol of the downlink slot.

20. The wireless device of claim 14, wherein receiving the one or more downlink reference signals comprises receiving frequency-division multiplexed downlink reference signals on the sidelink communication link via resource elements of a resource block.

21. The wireless device of claim 20, wherein, to receive the one or more downlink reference signals, the one or more processors are individually or collectively operable to execute the code to cause the wireless device to:

receive the one or more downlink reference signals on the sidelink communication link based at least in part on a plurality of ports mapped to the resource elements of the resource block with a frequency domain mapping having a density of at least six.

22. The wireless device of claim 14, wherein, to receive the one or more downlink reference signals, the one or more processors are individually or collectively operable to execute the code to cause the wireless device to:

receive the one or more downlink reference signals on an orthogonal frequency-division multiplexing symbol without data multiplexing.

23. The wireless device of claim 14, wherein the set of uplink resources for the sample message is within a threshold time interval after the set of downlink resources for the one or more downlink reference signals.

24. The wireless device of claim 14, wherein the one or more processors are individually or collectively further operable to execute the code to cause the wireless device to:

receive a second pre-equalized data signal via a first downlink slot, wherein the one or more downlink reference signals are received via a latter portion of the first downlink slot, the raw reference signal samples are transmitted via an uplink slot following the first downlink slot, and the data signal is received via a second downlink slot after the uplink slot.

25. The wireless device of claim 14, wherein the wireless device is an extended reality device and the data signal is indicative of video data.

26. The wireless device of claim 14, wherein:

the one or more downlink reference signals comprise one or more demodulation reference signals or one or more channel state information reference signals.

27. A method for wireless communications at a user equipment (UE), comprising:

transmitting, to a wireless device, a resource allocation message indicating an allocation of a set of downlink resources for one or more downlink reference signals and an allocation of a set of uplink resources for a sample message;

transmitting the one or more downlink reference signals to the wireless device via a sidelink communication link and the set of downlink resources in accordance with the resource allocation message;

receiving, from the wireless device via the sidelink communication link and the set of uplink resources in accordance with the resource allocation message, the sample message indicating raw reference signal samples of the one or more downlink reference signals; and transmitting a data signal to the wireless device, wherein the data signal is pre-equalized using a downlink channel estimation that is based at least in part on a reconstruction of the raw reference signal samples.

28. A method for wireless communications at a wireless device, comprising:

receiving, from a user equipment (UE), a resource allocation message indicating an allocation of a set of downlink resources for one or more downlink reference signals and an allocation of a set of uplink resources for a sample message;

receiving, from the UE, the one or more downlink reference signals via a sidelink communication link and the set of downlink resources in accordance with the resource allocation message;

transmitting, to the UE via the sidelink communication link and the set of uplink resources in accordance with the resource allocation message, the sample message indicating raw reference signal samples of the one or more downlink reference signals; and receiving a data signal from the UE, wherein the data signal is pre-equalized in accordance with a downlink channel estimation that is based at least in part on a reconstruction of the raw reference signal samples.

*   *   *   *   *